(12) United States Patent
Matsuoka

(10) Patent No.: US 12,522,143 B2
(45) Date of Patent: Jan. 13, 2026

(54) SURROUND VIEW MONITOR SYSTEM, AND WORK MACHINE

(71) Applicant: SUMITOMO HEAVY INDUSTRIES, LTD., Tokyo (JP)

(72) Inventor: Taira Matsuoka, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/763,214

(22) Filed: Jul. 3, 2024

(65) Prior Publication Data

US 2024/0359626 A1    Oct. 31, 2024

Related U.S. Application Data

(63) Continuation of application No. PCT/JP2022/048578, filed on Dec. 28, 2022.

(30) Foreign Application Priority Data

Jan. 6, 2022   (JP) .................. 2022-001192

(51) Int. Cl.
  *B60R 1/27*   (2022.01)
  *E02F 9/24*   (2006.01)

(52) U.S. Cl.
  CPC . *B60R 1/27* (2022.01); *E02F 9/24* (2013.01)

(58) Field of Classification Search
  None
  See application file for complete search history.

(56) References Cited

U.S. PATENT DOCUMENTS

| | | | |
|---|---|---|---|
| 2016/0082954 A1* | 3/2016 | Rennemann | E02F 3/651 701/50 |
| 2018/0245314 A1 | 8/2018 | Yamaguchi et al. | |
| 2020/0048871 A1 | 2/2020 | Nishizawa et al. | |
| 2020/0165799 A1 | 5/2020 | Wu et al. | |
| 2021/0104834 A1 | 4/2021 | Hashiguchi | |
| 2022/0311974 A1* | 9/2022 | Huenink | H04N 23/60 |
| 2023/0033706 A1 | 2/2023 | Sasaki et al. | |
| 2023/0094845 A1* | 3/2023 | Marsolek | G05D 1/0022 701/2 |

FOREIGN PATENT DOCUMENTS

| JP | 2014-181508 | 9/2014 |
|---|---|---|
| JP | 2017-072425 | 4/2017 |

(Continued)

OTHER PUBLICATIONS

International Search Report for PCT/JP2022/048578 mailed on Feb. 21, 2023.

*Primary Examiner* — Rebecca A Volentine
(74) *Attorney, Agent, or Firm* — IPUSA, PLLC

(57) ABSTRACT

A technique capable of more appropriately monitoring objects around a work machine is provided. A surround view monitor system includes: an excavator including a communication device; and an external surround view monitor sensor (for example, an imaging device or a distance sensor) configured to acquire data on objects around the excavator. The excavator acquires output data of the external surround view monitor sensor or processed data generated based on the output data of the external surround view monitor sensor via the communication device.

16 Claims, 13 Drawing Sheets

(56) References Cited

FOREIGN PATENT DOCUMENTS

| | | |
|---|---|---|
| JP | 2019-039206 | 3/2019 |
| JP | 2021-061172 | 4/2021 |
| WO | 2019/026802 | 2/2019 |
| WO | 2020/069747 | 4/2020 |
| WO | 2021/176883 | 9/2021 |

* cited by examiner

SURROUND VIEW MONITOR SYSTEM, AND WORK MACHINE

CROSS-REFERENCE TO RELATED APPLICATIONS

This application is a continuation application of International Application No. PCT/JP2022/048578, filed on Dec. 28, 2022, and designating the U.S., which is based upon and claims priority to Japanese Patent Application No. 2022-001192, filed on Jan. 6, 2022, the entire contents of which are incorporated herein by reference.

BACKGROUND

Technical Field

This disclosure relates to a surround view monitor system, and the like.

Background Art

For example, there is a known technology for monitoring the status of objects (obstacles), such as people around a work machine, by using surround view monitor sensors, such as cameras and distance sensors.

SUMMARY

However, in a case where a surround view monitor sensor is not mounted, as is often the case with an old-model work machine, it is impossible to monitor objects around the work machine in the first place. In addition, even in a case where a surround view monitor sensor is mounted on a work machine, for example, depending on the number and positioning of the surround view monitor sensors on the work machine, a blind spot may occur and it may be impossible to properly monitor objects around the work machine.

Therefore, in view of the above problems, it is an object to provide a technology capable of more appropriately monitoring objects around the work machine.

In order to achieve the above object, one embodiment of the present disclosure provides a surround view monitor system, including:
  a first work machine including a first communication device; and
  an external surround view monitor sensor configured to acquire data on an object around the first work machine,
  wherein the first work machine acquires, via the first communication device, output data of the external surround view monitor sensor or processed data generated based on the output data of the external surround view monitor sensor.

Another embodiment of the present disclosure provides a work machine, including:
  a communication device,
  wherein the work machine acquires, via the communication device, output data of an external surround view monitor sensor configured to acquire data on an object around the work machine, or processed data generated based on the output data of the external surround view monitor sensor.

Yet another embodiment of the present disclosure provides a work machine, including:
  a communication device; and
  a surround view monitor sensor configured to acquire data on an object around the work machine,
  wherein the work machine transmits, via the communication device, output data of the surround view monitor sensor or processed data generated based on the output data of the surround view monitor sensor to another work machine around the work machine.

According to the above-described embodiments, it is possible to more appropriately monitor objects around a work machine.

DETAILED DESCRIPTION OF THE INVENTION

Embodiments will be described below with reference to the drawings.

[Overview of the Surround View Monitor System]

First, an overview of a surround view monitor system SYS according to the present embodiment will be described with reference to FIGS. 1 to 6.

Figure 1:
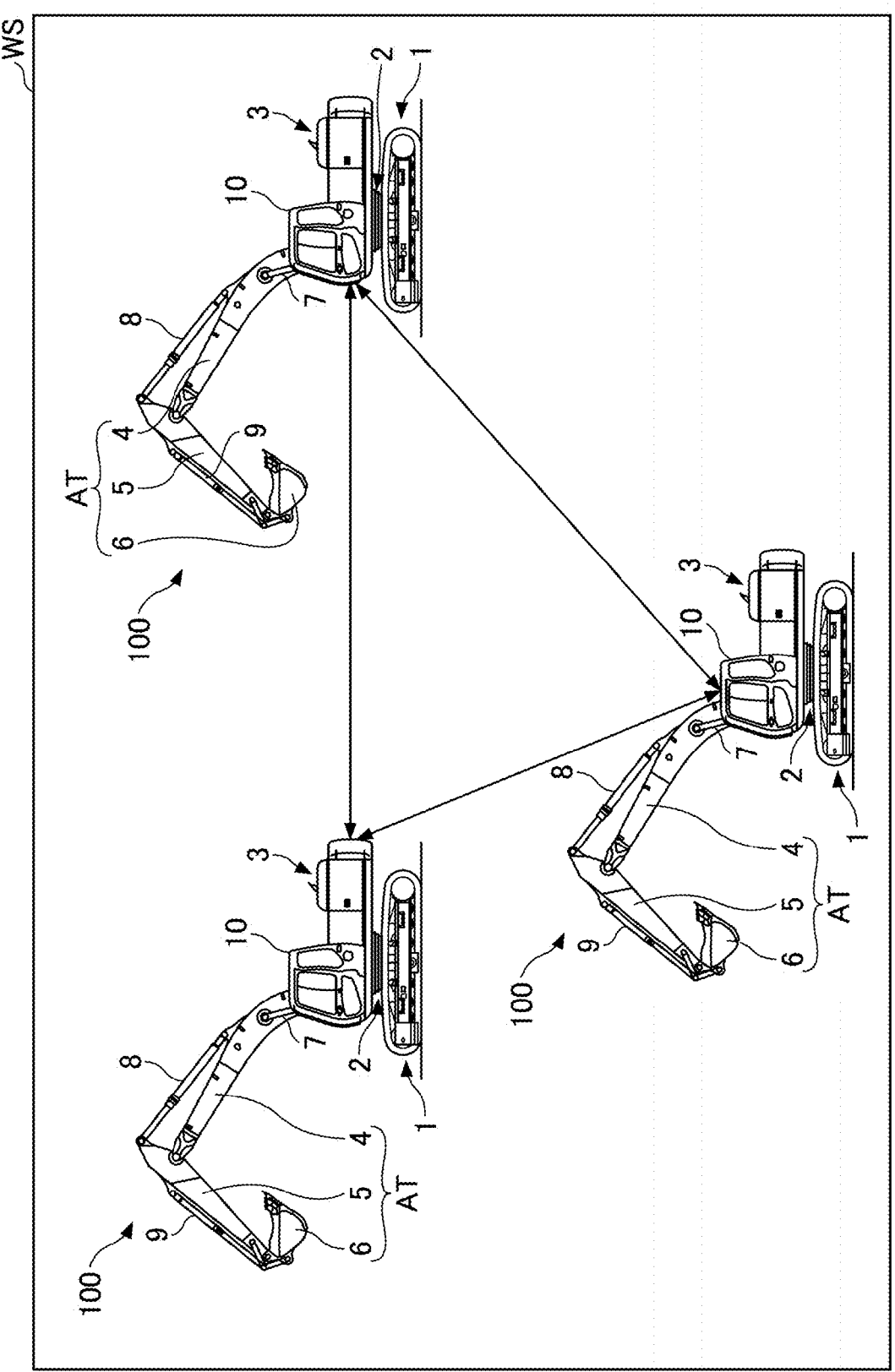
FIG. 1 illustrates an example of a surround view monitor system.
Figure 2:
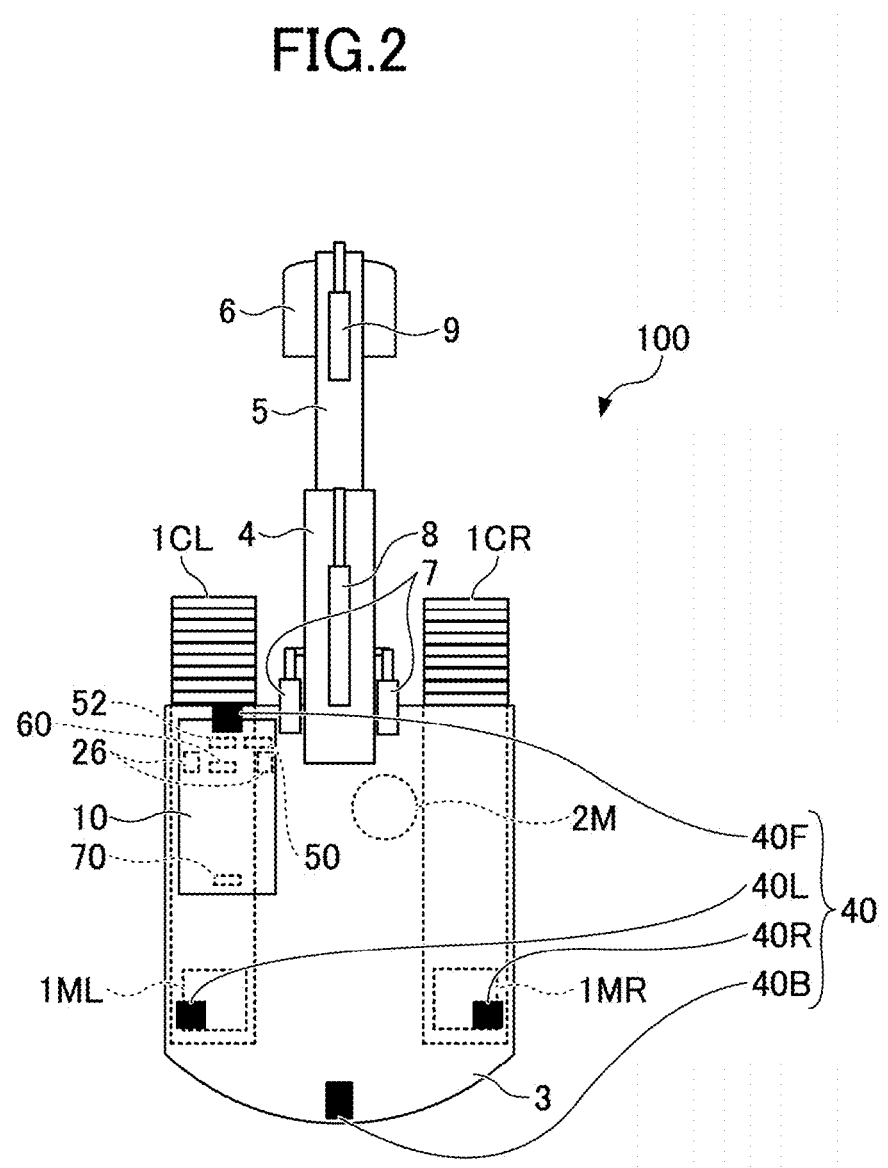
FIG. 2 is a top view illustrating an example of an excavator.
Figure 3:
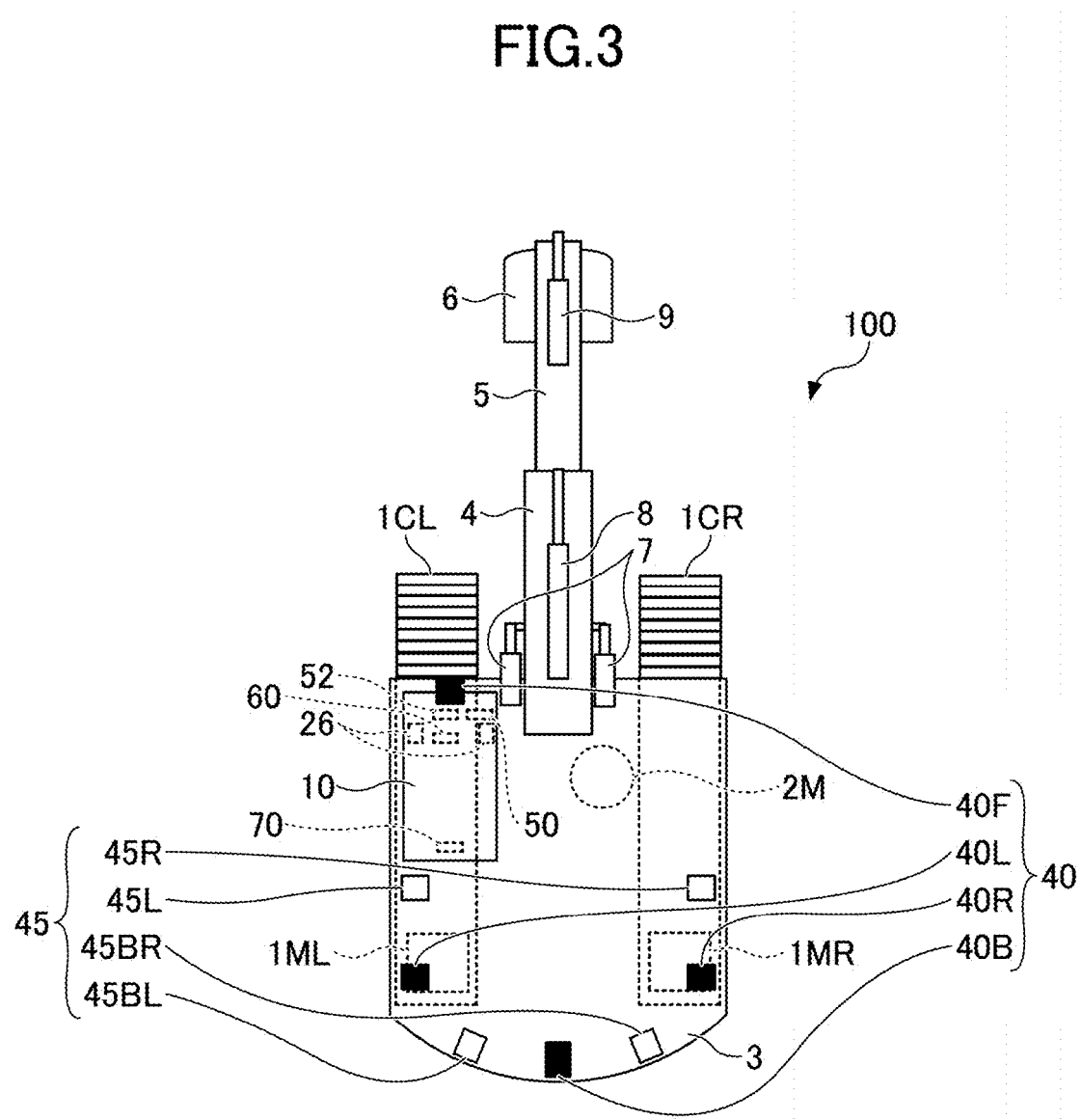
FIG. 3 is a top view illustrating another example of an excavator.
Figure 4:
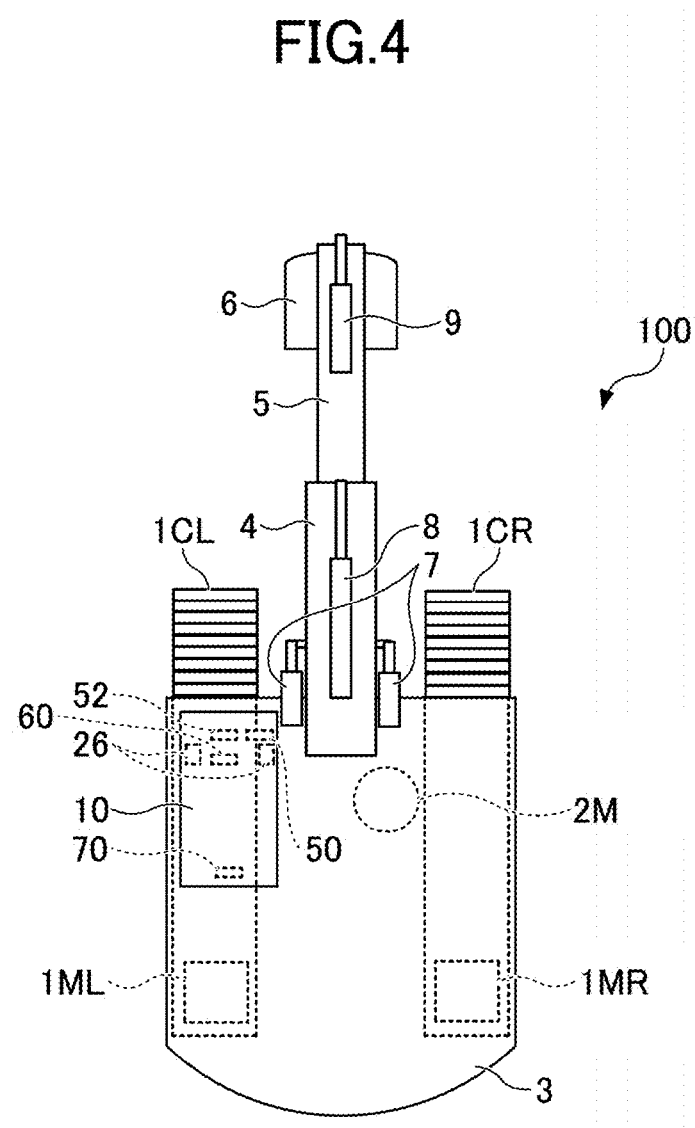
FIG. 4 is a top view illustrating yet another example of an excavator.
Figure 5:
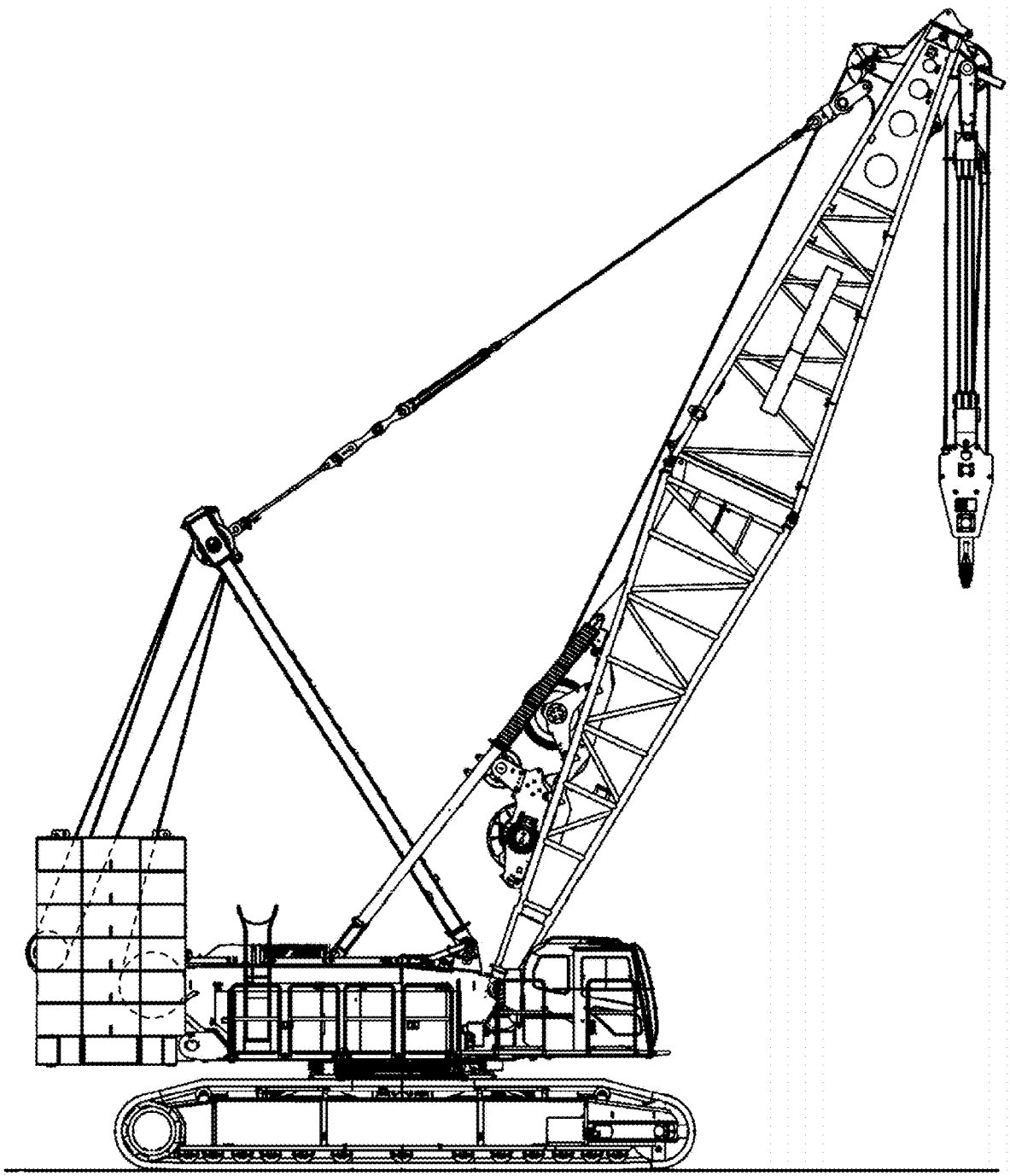
FIG. 5 is a view illustrating another example of a work machine.
Figure 6:
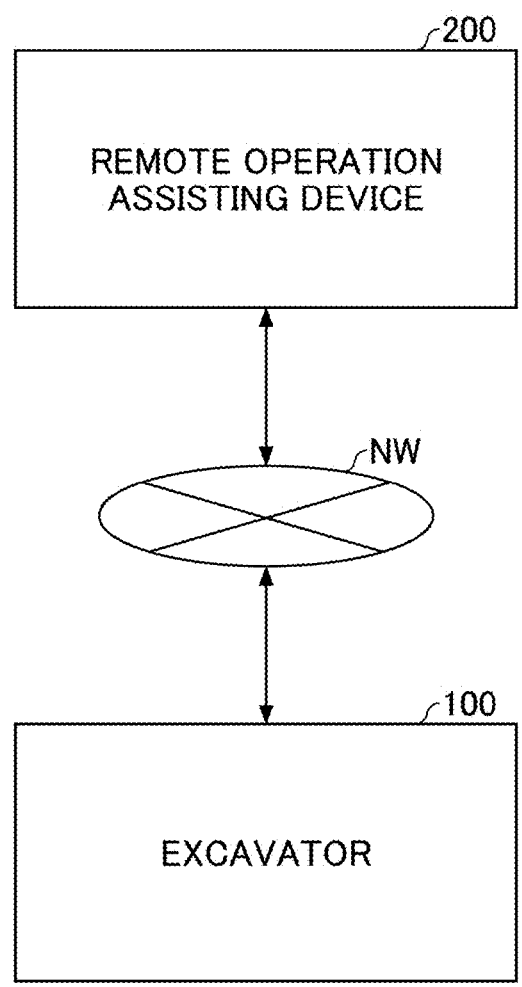
FIG. 6 is a view illustrating an example of a configuration involved in a remote operation of an excavator.

FIG. 1 is a diagram illustrating an example of the surround view monitor system SYS. FIG. 1 illustrates a left side view of an excavator 100. FIGS. 2 to 4 are top views illustrating one example, another example, and yet another example of the excavator 100. FIG. 5 is a view illustrating another example of a work machine. FIG. 6 is a view illustrating an example of a configuration involved in a remote operation of the excavator 100.

As illustrated in FIG. 1, the surround view monitor system SYS includes a plurality of excavators 100 (an example of a work machine) that perform work at locations relatively close to each other. Specifically, the surround view monitor system SYS includes a plurality of excavators 100 performing work at the same work site WS.

For example, as illustrated in FIG. 1, the surround view monitor system SYS includes three excavators 100. The surround view monitor system SYS may include only two excavators 100 or more than four excavators 100.

In the surround view monitor system SYS, the excavator 100 acquires output data of a surround view monitor sensor (an example of an external surround view monitor sensor) mounted on another excavator 100 (an example of a predetermined machine). Further, the excavator 100 may acquire processed data (hereinafter, "output processed data") generated based on the output data of the surround view monitor sensor of another excavator 100 from the another excavator 100. Thus, the excavator 100 can monitor obstacles in its surroundings using the data acquired from another excavator 100. The monitoring of obstacles in the surroundings of an excavator includes detection (determination) of presence or absence of existence of obstacles in the excavator's surroundings and spotting (determination) of the location of the obstacles, and the like. Hereinafter, a freely-selected excavator 100 that is the main subject of the following description among the plurality of excavators 100 will be referred to by using such terms as "subject excavator" "subject machine", "itself", "its", "its own", "thereof", "thereon", and the like.

Exchange of data between the excavators 100 may be performed directly through a local communication network in the work site WS or indirectly via a predetermined relay device (for example, a server) or the like installed in the work site. Hereinafter, the former case will be mainly described.

A surround view monitor sensor mounted on an excavator 100 acquires data on objects around the excavator 100. For example, as illustrated in FIGS. 2 and 3, the surround view monitor sensor is an imaging device 40, a distance sensor 45, or the like. The output data and the output processed data of the surround view monitor sensor are source data used to detect objects around the excavator 100. For example, the output processed data of the surround view monitor sensor when it is the imaging device 40 is compressed data obtained by reducing the resolution of the raw data of the captured image. For example, the output processed data of the surround view monitor sensor when it is the distance sensor 45 is coordinate information data of a group of dots representing the surface shape of an object around the excavator 100 with respect to the excavator 100, the data being generated based on the output data of the distance sensor 45.

For example, as illustrated in FIG. 2, the excavator 100 includes one type of a surround view monitor sensor. In this example, the excavator 100 includes an imaging device 40 as the surround view monitor sensor. In addition, the excavator 100 may include a distance sensor 45 described later in place of the imaging device 40. For example, as illustrated in FIG. 3, the excavator 100 may include a plurality of types of surround view monitor sensors. In this example, the excavator 100 includes an imaging device 40 and a distance sensor 45 as the surround view monitor sensors. Thus, the excavator 100 can provide output data or output processed data of the imaging device 40 and the distance sensor 45 to another excavator 100. The excavator 100 can monitor objects around the excavator 100 by using data acquired from another excavator 100 instead of or in addition to output data of its own surround view monitor sensor.

For example, as illustrated in FIG. 4, some excavators 100 of the plurality of excavators 100 of the surround view monitor system SYS need not necessarily be equipped with surround view monitor sensors. In this case, an excavator 100 not equipped with a surround view monitor sensor can monitor objects around the excavator 100 by using data acquired from other excavators 100 equipped with the surround view monitor sensors.

That is, in the present embodiment, at least one excavator 100 of the plurality of excavators 100 included in the surround view monitor system SYS is equipped with a surround view monitor sensor. As a result, the excavator 100 equipped with the surround view monitor sensor can provide output data and processed data of the surround view monitor sensor to other excavators 100 located in the surroundings thereof. Therefore, an excavator 100 can monitor the presence or absence of obstacles and the positions of obstacles in its surroundings by using output data and processed data of the surround view monitor sensor of another excavator 100.

The surround view monitor system SYS may include other work machines in place of or in addition to the excavator 100. For example, as illustrated in FIG. 5, the surround view monitor system SYS may include a mobile crane 300 (an example of the work machine and the predetermined machine). In addition, in the surround view monitor system SYS, some work machines of the plurality of work machines may be replaced with surround view monitor sensors that are installed at fixed positions at the work site WS, work vehicles present at the work site WS, drones, and the like (all being examples of the predetermined machine). As a result, the excavator 100 can acquire output data or output processed data of the surround view monitor sensors installed at fixed positions at the work site WS, the work vehicles of the work site WS, surround view monitor sensors mounted on the drones, and the like, and monitor objects around the subject excavator based on the data.

As illustrated in FIG. 1, the excavator 100 includes a lower traveling body 1, an upper turning body 3, an attachment AT including a boom 4, an arm 5, and a bucket 6, and a cabin 10.

The lower traveling body 1 includes, for example, a crawler 1CL on the left side and a crawler 1CR on the right side, and the crawlers 1CL and 1CR are hydraulically driven by their corresponding traveling hydraulic motors 1M.

The upper turning body 3 is rotatably mounted on the lower traveling body 1 via a turning mechanism 2. For example, the upper turning body 3 rotates with respect to the lower traveling body 1 when the turning mechanism 2 is hydraulically driven by a turning hydraulic motor 2M (see FIGS. 4 to 7).

The boom 4 is attached to the center of the front part of the upper turning body 3 such that the boom 4 can be elevated or lowered about a rotation shaft extending in the left-right direction. The arm 5 is attached to an end of the boom 4 such that the arm 5 can be rotated about a rotation shaft in the left-right direction. The bucket 6 is attached to an end of the arm 5 such that the bucket 6 can be rotated about a rotation shaft in the left-right direction.

The bucket 6 is an example of an end attachment and is attached to the end of the arm 5 in a manner that the bucket 6 can be appropriately replaced according to the work content of the excavator 100. That is, in place of the bucket 6, a bucket of a different type from the bucket 6 may be attached to the end of the arm 5, such as a relatively large large-sized bucket, a bucket for slope, a bucket for dredging, or the like. In addition, an end attachment of a type other than buckets may be attached to the end of the arm 5, such as an agitator, a breaker, a crusher, or the like. A spare attachment such as, for example, a quick coupling, a tilt rotator, or the like may be provided between the arm 5 and the end attachment.

The boom 4, the arm 5, and the bucket 6 are hydraulically driven by a boom cylinder 7, an arm cylinder 8, and a bucket cylinder 9, respectively.

The cabin 10 is a control chamber on which an operator rides to operate the excavator 100, and is mounted, for example, on the left side of the front part of the upper turning body 3.

The excavator 100 moves drive-target components such as the lower traveling body 1 (that is, the pair of right and left crawlers 1C), the upper turning body 3, the boom 4, the arm 5, the bucket 6 and the like in response to an operation of an operator riding on the cabin 10.

Instead of or in addition to being operable by an operator riding on the cabin 10, the excavator 100 may be remotely operable from outside the excavator 100. When the excavator 100 is remotely operated, the cabin 10 may be unattended. Hereinafter, the description will proceed on the premise that the operation of the operator includes either or both of an operation by an operator on the cabin 10 performed via an operation device 26 and a remote operation performed by an external operator.

A remote operation includes, for example, a mode in which the excavator 100 is operated in accordance with an input of an operation regarding an actuator of the excavator 100, the input being entered via a remote operation assisting device 200 as illustrated in FIG. 6.

The remote operation assisting device 200 is provided, for example, in a management center for externally managing the work of the excavator 100.

The functions of the remote operation assisting device 200 are realized by desirably selected hardware or combination of desirably selected hardware and software. For example, the remote operation assisting device 200 is mainly formed of a computer including a Central Processing Unit (CPU), a memory device, an auxiliary storage device, an interface device, an input device, and a display device. The memory device is, for example, a Static Random Access Memory (SRAM), a Dynamic Random Access Memory (DRAM), or the like. The auxiliary storage device is, for example, a Hard Disc Drive (HDD), a Solid State Disk (SSD), an Electrically Erasable Programmable Read-Only Memory (EEPROM), a flash memory, or the like. The interface device includes an external interface configured to connect to an external recording medium and a communication interface configured to communicate with an external entity such as an excavator 100 and the like. The input device includes, for example, a lever-type operation input device. The display device includes, for example, a liquid crystal display or an organic Electro Luminescence (EL) display. The operator inputs an operation regarding an actuator of the excavator 100 by using the input device, and the remote operation assisting device 200 transmits a signal corresponding to the input operation to the excavator 100 by using the communication interface. Thus, the excavator 100 can realize a remote operation of the excavator 100 using the remote operation assisting device 200.

Specifically, the excavator 100 may transmit to the remote operation assisting device 200, for example, via a communication device 60 described later, an image (hereinafter, "surround view image") representing a state of the surrounding of the excavator 100 including the space ahead based on a captured image output by the imaging device 40 described later. The remote operation assisting device 200 may display the image (surround view image) received from the excavator 100 on the display device. Various information images (information screens) displayed on a display device 50A in the cabin 10 of the excavator 100 may also be displayed on the display device of the remote operation assisting device 200. As a result, an operator using the remote operation assisting device 200 can remotely operate the excavator 100 while, for example, checking the display contents of an image representing the state around the excavator 100 or an information screen displayed on the display device. Then, the excavator 100 may operate actuators in response to a remote operation signal representing the content of the remote operation received from the remote operation assisting device 200 via the communication device 60 and drive drive-target components such as the lower traveling body 1, the upper turning body 3, the boom 4, the arm 5, the bucket 6 and the like.

The remote operation may include, for example, a mode in which the excavator 100 is operated in response to an external sound input, gesture input, or the like to the excavator 100 from a person (for example, a worker) around the excavator 100. More specifically, the excavator 100 recognizes speech uttered by a surrounding worker or the like or gestures performed by a worker or the like via a sound input device (for example, a microphone) or a gesture input device (for example, an imaging device) mounted on thereon. The excavator 100 may operate the actuators in accordance with the content of the recognized speech, gesture, or the like, and drive the drive-target components such as the lower traveling body 1 (right and left crawlers 1C), the upper turning body 3, the boom 4, the arm 5, the bucket 6, and the like.

The excavator 100 may automatically operate the actuators regardless of the content of an operation of the operator. Thus, the excavator 100 can realize a function ("automatic drive function" or "Machine Control (MC) function") for automatically operating at least part of the drive-target components such as the lower traveling body 1, the upper turning body 3, the boom 4, the arm 5, the bucket 6, and the like.

The automatic drive function includes, for example, a function ("semi-automatic drive function" or "operation assisting-type MC function") for automatically operating any drive-target components (actuators) that are other than the operation-target drive-target components (actuators) in response to an operator's operation via the operation device 26 or a remote operation. Further, the automatic drive function may include a function ("full automatic drive function" or "full automatic MC function") for automatically operating at least part of the plurality of drive-target components (actuators) in the absence of an operator's operation via the operation device 26 or a remote operation. When the full automatic drive function is active in the excavator 100, the cabin 10 may be unattended. In addition, the semi-automatic drive function, the full automatic drive function, and the like may include a mode in which the operation contents of the drive-target components (actuators) that are the target of automatic drive are automatically determined according to a predetermined rule. In addition, the semi-automatic drive function, the full automatic drive function, and the like may include a mode in which the excavator 100 autonomously performs various determinations, and the operation contents of the drive-target components (actuators) that are the target of automatic drive are autonomously determined according to the determination results ("autonomous drive function").

When the excavator 100 has the automatic drive function, the work of the excavator 100 may be remotely supervised. In this case, a remote monitor assisting device having the same functions as those of the remote operation assisting device 200 may be provided. Thus, a supervisor, who is the user of the remote monitor assisting device, can monitor the status of the work that is under the automatic drive function of the excavator 100 while checking the surround view image displayed on a display device of the remote monitor assisting device. For example, when determining it necessary from the viewpoint of safety, the supervisor can intervene and implement an emergency stop of the automatic drive function of the excavator 100 by performing a predetermined input via an input device of the remote monitor assisting device.

[Hardware Configuration of the Excavator]

Next, the hardware configuration of the excavator 100 will be described with reference to FIG. 7 in addition to FIGS. 1 to 6.

Figure 7:
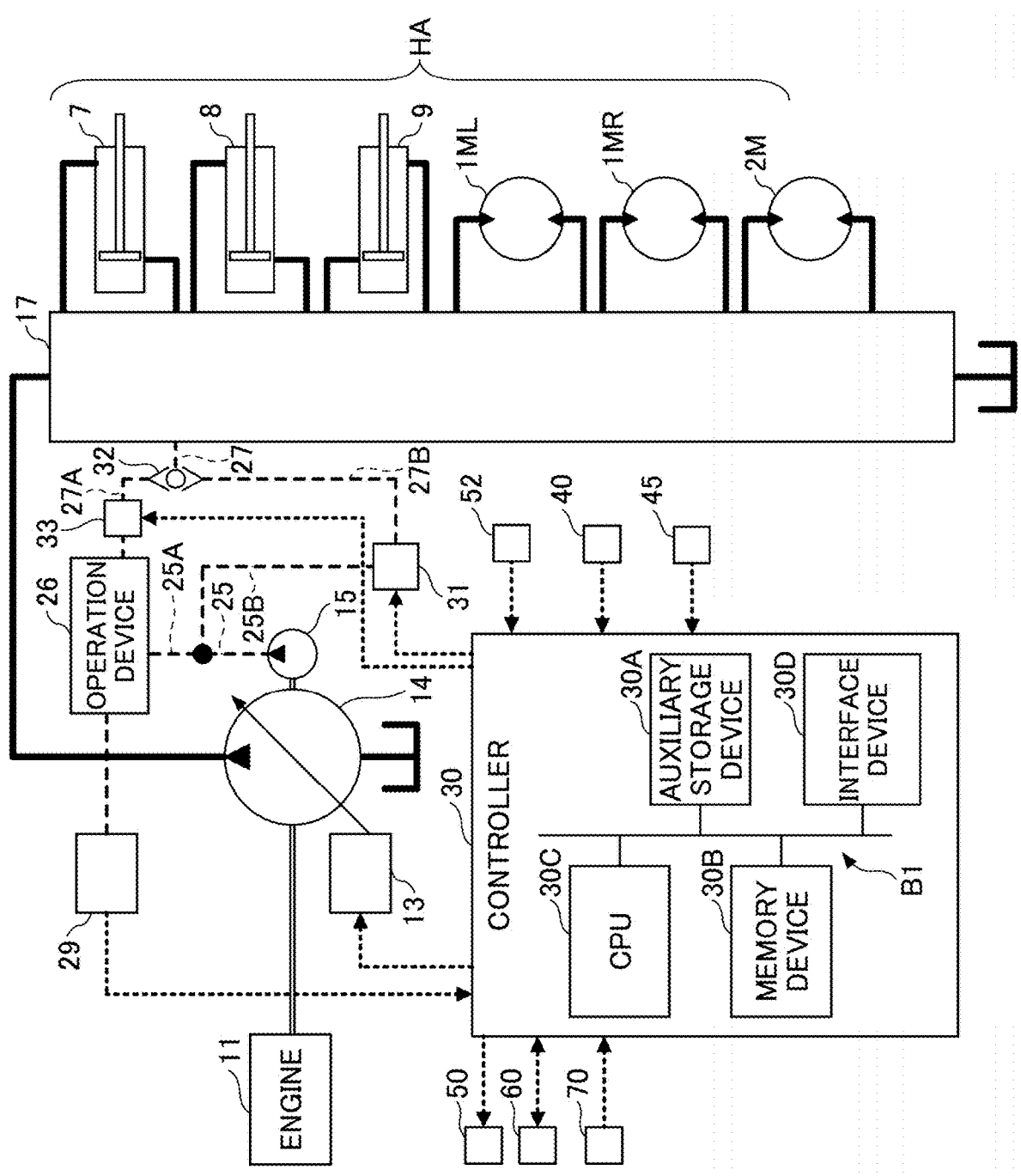
FIG. 7 is a view illustrating an example of a hardware configuration of an excavator.

FIG. 7 is a diagram illustrating an example of the hardware configuration of the excavator 100. Specifically, FIG. 7 is a diagram illustrating the configuration of the excavator 100 of FIG. 3.

In FIG. 7, the path through which a mechanical power is transmitted is indicated by a double line, the path through which a high-pressure operating oil for driving the hydraulic actuators flows is indicated by a solid line, the path through which a pilot pressure is transmitted is indicated by a dashed line, and the path through which an electrical signal is transmitted is indicated by a dotted line. Illustration in FIG. 2 of a distance sensor 45 of FIG. 7, which is the only lacking component of the configuration of the excavator 100 in FIG. 2, will be omitted by incorporation of FIG. 7. Similarly, illustration in FIG. 4 of the imaging device 40 and the distance sensor 45 of FIG. 7, which are the only lacking components of the configuration of the excavator 100 in FIG. 4 will be omitted by incorporation of FIG. 7.

The excavator 100 includes components belonging to a hydraulic drive system involved in hydraulic driving of the drive-target components, an operation system involved in operations of the drive-target components, a user interface system involved in exchange of information with the user, a communication system involved in communication with the outside, a control system involved in various controls, and the like.

<Hydraulic Drive System>

As illustrated in FIG. 7, the hydraulic drive system of the excavator 100 includes, as described above, hydraulic actuators HA that hydraulically drive the drive-target components such as the lower traveling body 1 (right and left crawlers 1C), the upper turning body 3, the attachment AT, and the like. The hydraulic drive system of the excavator 100 according to the present embodiment also includes an engine 11, a regulator 13, a main pump 14, and a control valve 17.

The hydraulic actuators HA include the traveling hydraulic motors 1ML, 1MR, the turning hydraulic motor 2M, the boom cylinder 7, the arm cylinder 8, the bucket cylinder 9, and the like.

A part or all of the hydraulic actuators HA of the excavator 100 may be replaced with an electric actuator. That is, the excavator 100 may be a hybrid excavator or an electric excavator.

The engine 11 is the prime mover of the excavator 100 and the main power source of the hydraulic drive system. The engine 11 is, for example, a diesel engine fueled with a diesel fuel. The engine 11 is, for example, mounted on the rear part of the upper turning body 3. The engine 11 constantly rotates at a predetermined target rotation rate under direct or indirect control of a controller 30 described later and drives the main pump 14 and a pilot pump 15.

Instead of or in addition to the engine 11, another engine (for example, an electric motor) or the like may be mounted on the excavator 100.

The regulator 13 controls (adjusts) the discharge amount of the main pump 14 under the control of the controller 30. For example, the regulator 13 adjusts the angle (hereinafter, "tilt angle") of the swash plate of the main pump 14 in response to a control command from the controller 30.

The main pump 14 supplies the operating oil to the control valve 17 through the high-pressure hydraulic line. The main pump 14 is mounted, for example, on the rear part of the upper turning body 3 like the engine 11. The main pump 14 is driven by the engine 11 as described above. The main pump 14 is, for example, a variable displacement hydraulic pump. The discharge flow rate and discharge pressure of the main pump are controlled in response to the stroke length of the piston of the main pump being adjusted by the tilt angle of the swash plate of the main pump being adjusted by the regulator 13 under the control of the controller 30 as described above.

The control valve 17 is a hydraulic control device configured to control the hydraulic actuators HA in accordance with the contents of the operator's operation via the operation device 26 or of a remote operation, or an operation command relating to the automatic drive function that is output from the controller 30. The operation command corresponding to the automatic drive function may be generated by the controller 30 or by another control device (arithmetic unit) configured to control the automatic drive function. The control valve 17 is mounted, for example, on the central part of the upper turning body 3. The control valve 17 is connected to the main pump 14 through the high-pressure hydraulic line as described above, and supplies the operating oil supplied from the main pump 14 selectively to corresponding hydraulic actuators in accordance with an operator's operation or an operation command corresponding to the automatic drive function. Specifically, the control valve 17 includes a plurality of control valves (also referred to as "direction switching valves") that are configured to control the flow rate and the flow direction of the operating oil supplied from the main pump 14 to the hydraulic actuators HA.

<Operation System>

As illustrated in FIG. 7, the operation system of the excavator 100 includes a pilot pump 15, an operation device 26, a hydraulic control valve 31, a shuttle valve 32, and a hydraulic control valve 33.

The pilot pump 15 supplies a pilot pressure to various hydraulic devices through a pilot line 25. The pilot pump 15 is mounted on, for example, the rear part of the upper turning body 3 like the engine 11. The pilot pump 15 is, for example, a fixed displacement hydraulic pump, and is driven by the engine 11 as described above.

The pilot pump 15 may be omitted. In this case, the operating oil having a relatively high pressure discharged from the main pump 14 may be reduced in pressure via a predetermined pressure reducing valve, and then the resulting operating oil having a relatively low pressure may be supplied to various hydraulic devices as a pilot pressure.

The operation device 26 is situated near the cockpit of the cabin 10 and is used by the operator to operate the various drive-target components. Specifically, the operation device 26 is used by the operator to operate the hydraulic actuators HA that drive the corresponding drive-target component, and as a result, the operator can realize the operation of the drive-target components that are the drive target of the hydraulic actuators HA. The operation device 26 includes a pedal device and a lever device via which each drive-target component (hydraulic actuator HA) is operated.

For example, as illustrated in FIG. 7, the operation device 26 is a hydraulic pilot type. Specifically, the operation device 26 utilizes the operating oil supplied from the pilot pump 15 through the pilot line 25 and a pilot line 25A branching from the pilot line 25, and outputs a pilot pressure corresponding to the content of an operation to a pilot line 27A on the secondary side. The pilot line 27A is connected to one inlet port of the shuttle valve 32, and is connected to the control valve 17 through a pilot line 27 connected to an outlet port of the shuttle valve 32. Thus, a pilot pressure corresponding to the content of the operation relating to various drive-target components (hydraulic actuators HA), which is performed via the operation device 26 can be input to the control valve 17 via the shuttle valve 32. Therefore, the control valve 17 can drive the respective hydraulic actuators HA in accordance with the content of the operation performed by the operator or the like via the operation device 26.

The operation device 26 may be an electric type. In this case, the pilot line 27A, the shuttle valve 32, and the hydraulic control valve 33 are omitted. Specifically, the operation device 26 outputs an electric signal corresponding to the content of an operation (hereinafter, "operation signal"), and the operation signal is taken into the controller 30. Then, the controller 30 outputs a control command corresponding to the content of the operation signal, that is, a control signal corresponding to the content of the operation performed via the operation device 26, to the hydraulic control valve 31. As a result, a pilot pressure corresponding to the content of the operation performed via the operation device 26 is input to the control valve 17 from the hydraulic control valve 31, and the control valve 17 can drive the respective hydraulic actuators HA in accordance with the content of the operation performed via the operation device 26. In addition, the control valves (direction switching valves) configured to drive the respective hydraulic actuators HA and contained in the control valve 17 may be an electromagnetic solenoid type. In this case, an operation signal that is output from the operation device 26 may be directly input into the control valve 17, that is, the electromagnetic solenoid type control valves. In addition, as described above, part or all of the hydraulic actuators HA may be replaced with electric actuators. In this case, the controller 30 may output a control command corresponding to the content of an operation performed via the operation device 26, the content of a remote operation specified by a remote operation signal, the content of an operation command corresponding to the automatic drive function, or the like, to the electric actuator or to drivers configured to drive the electric actuators. In addition, when the excavator 100 is operated remotely or by the automatic drive function, the operation device 26 may be omitted.

The hydraulic control valve 31 is provided for each drive-target component (hydraulic actuator HA) that is the target of operating via the operation device 26 and for each driving direction (for example, the raising direction and the lowering direction of the boom 4) of the drive-target components (hydraulic actuators HA). That is, two hydraulic control valves 31 are provided for each double-acting hydraulic actuator HA. The hydraulic control valve 31 may be situated on a pilot line 25B between the pilot pump 15 and the control valve 17, and, for example, the flow path area (that is, the cross-sectional area over which the operating oil can flow) of the hydraulic control valve may be variable. Thus, the hydraulic control valve 31 can output a predetermined pilot pressure to the pilot line 27B on the secondary side by using the operating oil of the pilot pump 15 supplied through the pilot line 25B. Therefore, as illustrated in FIG. 4, the hydraulic control valve 31 can indirectly cause a predetermined pilot pressure corresponding to a control signal from the controller 30 to act on the control valve 17 via the shuttle valve 32 between the pilot line 27B and the pilot line 27. Therefore, the controller 30 can cause a pilot pressure corresponding to the content of an operation performed via the operation device 26 to be supplied from the hydraulic control valve 31 to the control valve 17, and realize an operation of the excavator 100 based on the operator's operation.

The controller 30 may, for example, control the hydraulic control valve 31 and realize the automatic drive function. Specifically, the controller 30 outputs a control signal corresponding to an operation command relating to the automatic drive function to the hydraulic control valve 31 regardless of whether or not the operation device 26 is operated. As a result, the controller 30 can cause a pilot pressure corresponding to the operation command relating to the automatic drive function to be supplied from the hydraulic control valve 31 to the control valve 17, and realize an operation of the excavator 100 based on the automatic drive function.

Further, the controller 30 may, for example, control the hydraulic control valve 31 and realize a remote operation of the excavator 100. Specifically, the controller 30 outputs a control signal corresponding to the content of a remote operation specified by a remote operation signal received from the remote operation assisting device 200 via the communication device 60 to the hydraulic control valve 31. As a result, the controller 30 can cause a pilot pressure corresponding to the content of the remote operation to be supplied from the hydraulic control valve 31 to the control valve 17, and realize an operation of the excavator 100 based on the remote operation of the operator.

The shuttle valve 32 has two inlet ports and one outlet port, and outputs via the outlet port, the operating oil having the higher pilot pressure of the pilot pressures input into the two inlet ports. The shuttle valve 32 is provided for each drive-target component (hydraulic actuator HA) that is the target of operating via the operation device 26 and for each driving direction of the drive-target components (hydraulic actuators HA). One of the two inlet ports of the shuttle valve 32 is connected to the pilot line 27A on the secondary side of the operation device 26 (specifically, the lever device and the pedal device included in the operation device 26), and the other is connected to the pilot line 27B on the secondary side of the hydraulic control valve 31. The outlet port of the shuttle valve 32 is connected to the pilot port of a corresponding control valve of the control valve 17 through the pilot line 27. The corresponding control valve is a control valve that drives the hydraulic actuator that is the target of operating via the above-described lever device or pedal device connected to the one inlet port of the shuttle valve 32. Therefore, each of the shuttle valves 32 can cause the higher one of the pilot pressure on the pilot line 27A on the secondary side of the operation device 26 and the pilot pressure on the pilot line 27B on the secondary side of the hydraulic control valve 31 to act on the pilot port of the corresponding control valve. That is, the controller 30 can control the corresponding control valve regardless of the operator's operation via the operation device 26 by causing the hydraulic control valve 31 to output a pilot pressure that is higher than the pilot pressure on the secondary side of the operation device 26. Therefore, the controller 30 can control the operation of the drive-target components (the lower traveling body 1, the upper turning body 3, and the attachment AT) and realize the automatic drive function regardless of the state of the operator's operation via the operation device 26.

The hydraulic control valve 33 is situated on the pilot line 27A connecting the operation device 26 and the shuttle valve 32 to each other. For example, the flow path area of the hydraulic control valve 33 is variable. The hydraulic control valve 33 operates in accordance with a control signal that is input from the controller 30. As a result, the controller 30 can forcibly reduce the pilot pressure that is output from the operation device 26 when the operation device 26 is operated by an operator. Therefore, the controller 30 can forcibly suppress or stop the operation of the hydraulic actuators corresponding to an operation via the operation device 26 even when the operation device 26 is operated. For example, the controller 30 can reduce the pilot pressure output from the operation device 26 to become lower than the pilot pressure output from the hydraulic control valve 31 even when the operation device 26 is operated. Therefore, for example, by controlling the hydraulic control valve 31 and the hydraulic control valve 33, the controller 30 can cause a desired pilot pressure to reliably act on the pilot port of a control valve of the control valve 17, regardless of the content of the operation performed via the operation device 26. Therefore, for example, by controlling the hydraulic control valve 33 in addition to the hydraulic control valve 31, the controller 30 can more appropriately realize the automatic drive function and the remote operation function of the excavator 100.

<User Interface>

As illustrated in FIG. 7, the user interface system of the excavator 100 includes the operation device 26, an output device 50, and an input device 52.

The output device 50 outputs various information to a user of the excavator 100 (for example, an operator in the cabin 10 or an external remote operator), a person in the surroundings of the excavator 100 (for example, a worker or a driver of a work vehicle), and the like.

For example, the output device 50 includes a lighting device, a display device 50A (see FIG. 8), and the like configured to output various information in a visual manner. The lighting device is, for example, a warning lamp. The display device 50A is, for example, a liquid crystal display, an organic EL display, or the like. For example, as illustrated in FIGS. 2 to 4, the lighting device or the display device 50A may be situated in the cabin 10 and output various information in a visual manner to an operator or the like in the cabin 10. The lighting device or the display device 50A may be situated on the side surface or the like of the upper turning body 3 and output various information in a visual manner to a worker or the like around the excavator 100.

For example, the output device 50 includes a sound output device 50B (see FIG. 8) configured to output various information in an auditory manner. The sound output device 50B includes, for example, a buzzer, a loudspeaker, and the like. The sound output device 50B may be situated, for example, on either or both of the interior and the exterior of the cabin 10, and may output various information in an auditory manner to an operator in the cabin 10 or a person (such as a worker) around the excavator 100.

The output device 50 may also include, for example, a device that outputs various information in a tactile manner, such as vibration of the cockpit.

The input device 52 accepts various inputs from the user of the excavator 100, and signals corresponding to the accepted inputs are taken into the controller 30. The input device 52 is situated, for example, in the cabin 10, and accepts inputs from an operator or the like in the cabin 10. The input device 52 may be situated, for example, on the side surface or the like of the upper turning body 3, and accept inputs from a worker or the like around the excavator 100.

For example, the input device 52 includes an operation input device that accepts an operation input. The operation input device may include a touch panel mounted on the display device, a touch pad installed around the display device, a button switch, a lever, a toggle, a knob switch provided on the operation device 26 (lever device), and the like.

For example, the input device 52 may include a sound input device that accepts a sound input from a user. The sound input device may include, for example, a microphone.

The input device 52 may also include, for example, a gesture input device that accepts a user's gesture input. The gesture input device may include, for example, an imaging device that captures an image of a user's gesture.

Also, for example, the input device 52 may include a biological input device that accepts a user's biological input. The biological input may include, for example, an input of biological information such as a user's fingerprint, iris, and the like.

<Communication System>

As illustrated in FIG. 7, the communication system of the excavator 100 according to the present embodiment includes the communication device 60.

The communication device 60 is configured to connect to an external communication network and communicate with a device provided separately from the excavator 100. Examples of the device provided separately from the excavator 100 may include not only a device located outside the excavator 100, but also a carriable terminal device (portable terminal) brought into the cabin 10 by the user of the excavator 100. The communication device 60 may include, for example, a mobile communication module conforming to such protocols as $4^{th}$ Generation (4G) and $5^{th}$ Generation (5G). The communication device 60 may also include, for example, a satellite communication module. The communication device 60 may also include, for example, a WiFi communication module, a Bluetooth communication module, or the like. The communication device 60 may also include a plurality of communication devices depending on the communication networks to connect to.

For example, the communication device 60 communicates with another excavator 100 through a local communication network constructed at the work site WS. The local communication network is, for example, a mobile communication line based on what is generally referred to as local 5G constructed at the work site WS or a local network (Local Area Network (LAN)) based on WiFi6.

For example, the communication device 60 communicates with the remote operation assisting device 200 located outside the work site WS through a wide-area communication network that is, a Wide Area Network (WAN) covering the work site WS. The wide area network includes, for example, a wide-area mobile communication network, a satellite communication network, an Internet network, and the like.

<Control System>

As illustrated in FIG. 7, the control system of the excavator 100 includes the controller 30. The control system of the excavator 100 according to the present embodiment also includes an operation pressure sensor 29 and a position sensor 70. The control system of at least one excavator 100 among the excavators 100 included in the surround view monitor system SYS includes the imaging device 40 or the distance sensor 45 as the surround view monitor sensor as described above.

The controller 30 performs various controls on the excavator 100.

The functions of the controller 30 may be implemented by desirably selected hardware or combination of desirably selected hardware and software. For example, as illustrated in FIG. 4, the controller 30 includes an auxiliary storage device 30A, a memory device 30B, a CPU 30C, and an interface device 30D that are connected through a bus B1.

The auxiliary storage device 30A is a nonvolatile storage means that stores programs installed and necessary files, data, and the like. The auxiliary storage device 30A is, for example, an EEPROM or a flash memory.

The memory device 30B loads a program from the auxiliary storage device 30A such that the CPU 30C can read the program, when, for example, there is an instruction to start the program. The memory device 30B is, for example, an SRAM.

For example, the CPU 30C executes a program loaded into the memory device 30B, and realizes various functions of the controller 30 in accordance with instructions of the program.

The interface device 30D functions as, for example, a communication interface configured to connect to a communication network inside the excavator 100. The interface device 30D may include a plurality of different types of communication interfaces depending on the types of the communication networks to connect to.

The interface device 30D also functions as an external interface configured to read data from a recording medium and write data into a recording medium. The recording medium is, for example, a dedicated tool to be connected to a connector situated inside the cabin 10 through a cable that is detachably attachable to the connector. The recording medium may be, for example, a general-purpose recording medium such as an SD memory card or a Universal Serial Bus (USB) memory. Thus, for example, a program for realizing various functions of the controller 30 can be provided by a portable recording medium and installed in the auxiliary storage device 30A of the controller 30. The program may also be downloaded from any other computer outside the excavator 100 via the communication device 60 and installed in the auxiliary storage device 30A.

Some of the functions of the controller 30 may be realized by another controller (control device). That is, the functions of the controller 30 may be realized by a plurality of controllers in a distributed manner.

The operation pressure sensor 29 detects the pilot pressure on the secondary side (pilot line 27A) of the hydraulic pilot-type operation device 26, that is, the pilot pressure corresponding to the state of how each drive-target component (hydraulic actuator) is operated via the operation device 26. A signal indicating the pilot pressure that is detected by the operation pressure sensor 29 and corresponds to the state of how each drive-target component (hydraulic actuator HA) is operated via the operation device 26 is taken into the controller 30.

When the operation device 26 is an electric type, the operation pressure sensor 29 is omitted. This is because the controller 30 can know the state of how each drive-target component is operated via the operation device 26 based on an operation signal taken into from the operation device 26.

The position sensor 70 acquires data on the position of the excavator 100. The position sensor 70 is, for example, a Global Navigation Satellite System (GNSS) sensor capable of acquiring data on the absolute position. The position sensor 70 may be, for example, a transponder or the like capable of communicating with a predetermined device of the work site WS and acquiring data on the local position in the work site WS.

The position sensor 70 may be omitted as described later.

The imaging device 40 (an example of the surround view monitor sensor) acquires images representing the surround view of the excavator 100. The imaging device 40 may also acquire (generate) three-dimensional data representing the position and the outline of an object around the excavator 100 within an imaging range (angle of view) based on the acquired image and distance data described later (hereinafter simply referred to as "three-dimensional data of an object" or object's three-dimensional data, and the like). The three-dimensional data of an object around the excavator 100 may be, for example, coordinate information data of a group of dots representing the surface of the object, distance image data, or the like.

For example, as illustrated in FIGS. 2 and 3, the imaging device 40 includes a camera 40F configured to capture an image of the front view of the upper turning body 3, a camera 40B configured to capture an image of the rear view of the upper turning body 3, a camera 40L configured to capture an image of the left side view of the upper turning body 3, and a camera 40R configured to capture an image of the right side view of the upper turning body 3. As a result, the imaging device 40 can capture images of the whole surroundings around the excavator 100 when seen in a top view of the excavator 100, that is, over a range covering the 360-degree angular directions. In addition, the operator can visually confirm surround view images such as the captured images of the cameras 40B, 40L, and 40R and processed images generated based on the captured images via the display device 50A and a remote operation display device, and can confirm the states on the left side, the right side, and the rear side of the upper turning body 3. In addition, by visually confirming a surround view image such as the captured image of the camera 40F and a processed image generated based on the captured image via the remote operation display device, the operator can remotely operate the excavator 100 while confirming the movement of the attachment AT including the bucket 6. Hereinafter, the cameras 40F, 40B, 40L, and 40R may be referred to as "camera 40X" collectively or individually.

The camera 40X is, for example, a monocular camera. The camera 40X may be capable of acquiring distance (depth) data in addition to a two-dimensional image, like, for example, a stereo camera, a Time Of Flight (TOF) camera, and the like (hereinafter, referred to comprehensively as "3D camera").

Output data (for example, image data, three-dimensional data of an object around the excavator 100, and the like) of the imaging device 40 (camera 40X) is taken into the controller 30 through a one-to-one communication line or a vehicle-mounted network. Thus, the controller 30 can monitor the object around the excavator 100 based on the output data of the camera 40X.

Some of the cameras 40F, 40B, 40L, and 40R may be omitted. For example, if the excavator 100 is not remotely operated, the cameras 40F and 40L may be omitted. This is because the front view and left side view of the excavator 100 are relatively easy to view from the operator in the cabin 10.

The distance sensor 45 (an example of the surround view monitor sensor) is attached to the upper part of the upper turning body 3 and acquires data on the distance and the direction of the surrounding object with respect to the excavator 100. The distance sensor 45 may also acquire (generate) three-dimensional data of the object around the excavator 100 within the sensing range (for example, coordinate information data of a group of dots) based on the acquired data. The distance sensor 45 includes distance sensors 45BL, 45BR, 45L, and 45R. Hereinafter, the distance sensors 45BL, 45BR, 45L, and 45R may be collectively or individually referred to as the "distance sensor 45X".

The distance sensors 45BL, 45BR, 45L, and 45R are attached to a left-sided upper rear end portion, a right-sided upper rear end portion, an upper left end portion, and an upper right end portion of the upper turning body 3, respectively, and acquire data on the distances to objects on the left-sided rear side, the right-sided rear side, the left side, and the right side of the upper turning body 3. As a result, the distance sensor 45X can acquire data on the distances to the objects in an angular direction range ranging about the excavator 100 from the left side to the right side via the rear side when seen in a top view of the excavator 100.

The distance sensor 45X is, for example, a Light Detection and Ranging (LIDAR). For example, the distance sensor 45X may be a millimeter wave radar, an ultrasonic sensor, an infrared sensor, or the like.

Output data of the distance sensor 45 (the distance sensor 45X) is taken into the controller 30 through a one-to-one communication line or a vehicle-mounted network. Thus, the controller 30 can monitor objects around the excavator 100 based on the output data of the distance sensor 45X.

The distance sensors 45 may further include a distance sensor capable of acquiring data on the distance to an object in front of the excavator 100. In this case, the distance sensors 45X are capable of acquiring data on the distances to objects over the whole surroundings of the excavator 100 when seen in a top view of the excavator 100, that is, over a range covering the 360-degree angular directions. Some of the distance sensors 45BL, 45BR, 45L, and 45R may be omitted. For example, if the excavator 100 is not remotely operated, the distance sensor 45L may be omitted.

[Functional Configuration Relating to the Excavator's Surround View Monitor Function]

Next, the functional configuration relating to the surround view monitor function of the excavator 100 will be described with reference to FIG. 8.

Figure 8:
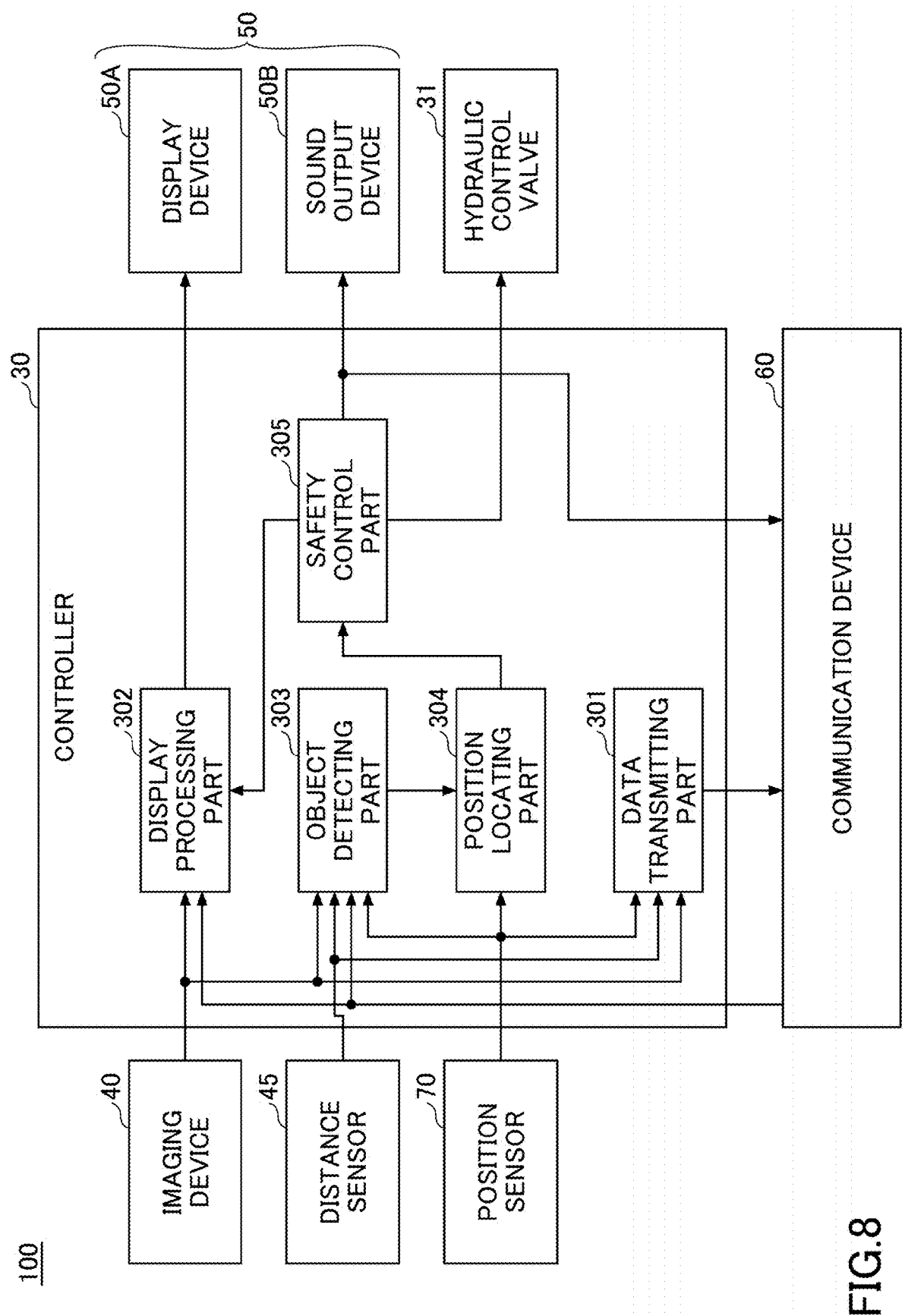
FIG. 8 is a block diagram illustrating an example of a configuration involved in a surround view monitor function of an excavator.

FIG. 8 is a diagram illustrating an example of the functional configuration relating to the surround view monitor function of the excavator 100. Specifically, FIG. 8 is a diagram illustrating an example of the functional configuration relating to the surround view monitor function of the excavator 100 of FIG. 3.

Illustration in FIG. 2 of the distance sensor 45 of FIG. 8, which is the only lacking component of the functional configuration relating to the surround view monitor function of the excavator 100 in FIG. 2, will be omitted by incorporation of FIG. 8. Similarly, illustration in FIG. 4 of the imaging device 40, the distance sensor 45, and a data transmitting part 301 of FIG. 8, which are the only lacking components of the functional configuration relating to the surround view monitor function of the excavator 100 in FIG. 4, will be omitted by incorporation of FIG. 8.

As illustrated in FIG. 8, the controller 30 includes a data transmitting part 301, a display processing part 302, an object detecting part 303, a position locating part 304, and a safety control part 305. The functions of the data transmitting part 301, the display processing part 302, the object detecting part 303, the position locating part 304, and the safety control part 305 are realized, for example, by a program installed in the auxiliary storage device 30A being loaded into the memory device 30B and executed on the CPU 30C.

The data transmitting part 301 transmits data acquired by the subject machine (excavator 100) to another excavator 100 via the communication device 60. For example, the data transmitting part 301 transmits output data or output processed data of the surround view monitor sensor (the imaging device 40 or the distance sensor 45) and output data or output processed data of the position sensor 70 to another other excavator 100. As a result, the another excavator 100 can acquire data on objects in its surroundings as seen from the transmitter excavator 100 and data on the position of the transmitter excavator 100. Hereinafter, output data or output processed data of the surround view monitor sensor may be referred to simply as "data of the surround view monitor sensor". The same applies to output data or output processed data of the imaging device 40 (camera 40X) and the distance sensor 45.

The display processing part 302 displays various information images on the display device 50A.

The display processing part 302 causes the display device 50A to display a surround view image of the subject machine (excavator 100) based on, for example, output data of the imaging device 40 of the subject machine. The display processing part 302 may also cause the display device 50A to display a three-dimensional image, such as a group of dots or a surface representing the position and the shape of an object around the subject machine as seen from a predetermined viewpoint based on output data of the distance sensor 45 of the subject machine (excavator 100).

The display processing part 302 also causes the display device 50A to display a surround view image of the subject machine as seen from the position of another excavator 100 based on, for example, data from the imaging device 40 of the another excavator 100. The display processing part 302 may also cause the display device 50A to display a surround view image as seen from the position of the subject machine based on data from the imaging device 40 of another excavator 100 and the relative position between the subject machine and the another excavator 100. The display processing part 302 may also cause the display device 50A to display a three-dimensional image of an object around the subject machine using a subject machine-based coordinate system based on data from the distance sensor 45 of another excavator 100 and the relative position between the subject machine and the another excavator 100. In this case, the controller 30 may determine the relative position between the subject machine and the another excavator 100 based on output data from the position sensor 70 of the subject machine and output data or output processed data from the position sensor 70 of the another excavator 100.

If the object detecting part 303 can detect another excavator 100, the controller 30 may use the position of the another excavator 100 located by the position locating part 304 as the relative position between the subject machine and the another excavator 100. If the object detecting part 303 of another excavator 100 can detect the subject machine, data on the position of the subject machine located by the position locating part 304 of the another excavator 100 may be provided to the subject machine from the another excavator 100. As a result, the controller 30 can determine the relative position between the subject excavator and the another excavator 100 based on the data received from the another excavator 100 regarding the position of the subject excavator as viewed from the another excavator 100. In these cases, the position sensor 70 of the excavator 100 may be omitted. In addition, when the excavator 100 is remotely operated, a surround view image or the like generated by the display processing part 302 may be transmitted to the remote operation assisting device 200, and the surround view image or the like of the excavator 100 may be displayed on the remote operation display device. In addition, the data acquired by the surround view monitor sensors (the imaging devices 40 or the distance sensors 45) of the subject machine and another excavator 100 may be transmitted to the remote operation assisting device 200. In this case, the remote operation assisting device 200 generates a surround view image or the like of the excavator 100, and the surround view image or the like of the excavator 100 is displayed on the remote operation display device.

The object detecting part 303 detects an obstacle (hereinafter simply "monitor-target object"), which may be the target of monitoring, from around the excavator 100. The monitor-target object includes, for example, a person such as a worker. The monitor-target object may also include, for example, other work machines, work vehicles, and the like. The monitor-target object may include, for example, specific stationary objects on the work site WS, such as utility poles, fences, traffic cones, and the like. The monitor-target object may also include, for example, a specific topographic shape of the work site WS such as a ditch, a hole, and the like.

For example, the object detecting part 303 detects the monitor-target object around the subject machine (excavator 100) by using a known method based on output data of the surround view monitor sensor (the imaging device 40 and the distance sensor 45) of the subject machine. When the subject machine is equipped with two or more types of surround view monitor sensors, the object detecting part 303 may detect an object around the subject machine by applying a sensor fusion technique to the output data of the two or more types of surround view monitor sensors.

For example, the object detecting part 303 detects a monitor-target object around the subject machine using a known method based on data from the surround view monitor sensor of another excavator 100. Here, the object detecting part 303 may use the data from the surround view monitor sensor of the another excavator 100 as is, or may use data corrected to reflect subject machine-based position information. In the latter case, the controller 30 corrects the data from the surround view monitor sensor of the another excavator 100 to subject machine's position-based data based on the relative position between the subject machine and the another excavator 100. Hereinafter, the data obtained by correcting the data from the surround view monitor sensor of another excavator 100 to the form that is based on the position of the subject machine may be, for the sake of expedience, referred to as "corrected data of the surround view monitor sensor". The same applies to data obtained by correcting data from the camera 40X and the distance sensor 45X of another excavator 100 to the form that is based on the position of the subject machine. For example, the controller 30 corrects data from the distance sensor 45X of another excavator 100, that is, the another excavator 100-based coordinate information data to the subject machine-based coordinate information data. For example, when the camera 40X is a 3D camera, the controller 30 corrects another excavator 100-based coordinate information data of each pixel of an image captured by the 3D camera of the another excavator 100 to the subject machine-based coordinate information data.

For example, the object detecting part 303 also detects a monitor-target object around the subject machine based on both of output data of the surround view monitor sensor of the subject machine and data from the surround view monitor sensor of another excavator 100. Specifically, the object detecting part 303 may detect a monitor-target object around the subject machine based on output data of the surround view monitor sensor of the subject machine, and may detect the monitor-target object around the subject machine based on data from the surround view monitor sensor of another excavator 100. For example, the object detecting part 303 detects an object around the subject machine based on an image from the camera 40X of the subject machine, and detects the object around the subject machine based on an image from the camera 40X of another excavator 100. The object detecting part 303 may also detect a monitor-target object around the subject machine based on data obtained by combining output data of the surround view monitor sensor of the subject machine and corrected data of the surround view monitor sensor of another excavator 100 as the subject machine-based coordinate system. For example, the controller 30 combines output data of the distance sensor 45 of the subject machine and corrected data of the distance sensor 45 of another excavator 100 as coordinate information data of a group of dots representing the position of an object as seen from the subject machine, and detects the object around the subject machine based on the data.

In addition, the object detecting part 303 may detect a monitor-target object around the subject machine based only on data from one of the surround view monitor sensors of the subject machine and another excavator 100 in a region where the sensing range of the surround view monitor sensor of the subject machine overlaps with the sensing range of the surround view monitor sensor of the another excavator 100. For example, the object detecting part 303 detects a monitor-target object around the subject machine based on output data of the surround view monitor sensor of the subject machine in a region within the sensing range of the surround view monitor sensor of the subject machine, the region being where the monitor-target object detection accuracy is relatively high. On the other hand, the object detecting part 303 preferentially uses data from the surround view monitor sensor of another excavator 100 to detect a monitor-target object around the subject machine in a region within the sensing range of the surround view monitor sensor of the subject machine, the region being where the monitor-target object detection accuracy is relatively low. Specifically, in a case where a region within the sensing range of the surround view monitor sensor of the subject machine where the monitor-target object detection accuracy is relatively low is included in the sensing range of the surround view monitor sensor of another excavator 100, the object detecting part 303 may detect the monitor-target object in that region based on data from the surround view monitor sensor of the another excavator 100. The region within the sensing range of the surround view monitor sensor of the subject machine where the monitor-target object detection accuracy is relatively low is, for example, a region near the border of the sensing range of the surround view monitor sensor of the subject machine. This is because a part of the monitor-target object present near the border of the sensing range of the surround view monitor sensor may extend outside the sensing range of the surround view monitor sensor, and as a result, the surround view monitor sensor may only be able to acquire data corresponding to a part of the monitor-target object.

In addition, the object detecting part 303 may detect an object around the subject machine based on data from the surround view monitor sensors of both of the subject machine and another excavator 100 in a region where the sensing range of the surround view monitor sensor of the subject machine overlaps with the sensing range of the surround view monitor sensor of the another excavator 100. In this case, the object detecting part 303 may prioritize one of their results of detection when there is a conflict between the result of detection based on the data from the surround view monitor sensor of the subject machine and the result of detection based on the data from the surround view monitor sensor of the another excavator 100. For example, the object detecting part 303 prioritizes the result of detection of the monitor-target object around the subject machine based on the output data of the surround view monitor sensor of the subject machine in a region within the sensing range of the surround view monitor sensor of the subject machine, the region being where the monitor-target object detection accuracy is relatively high. On the other hand, the object detecting part 303 prioritizes the result of detection of the monitor-target object around the subject machine based on the data from the surround view monitor sensor of the another excavator 100 in a region within the sensing range of the surround view monitor sensor of the subject machine, the region being where the monitor-target object detection accuracy is relatively low.

The object detecting part 303 may, for example, switch between using and not using data from the surround view monitor sensor of another excavator 100 depending on the positional relationship between the subject machine and the another excavator 100.

For example, the object detecting part 303 uses the data from the surround view monitor sensor of the another excavator 100 in a case where the distance between the subject machine and the another excavator 100 is less than or equal to a predetermined threshold or less than the predetermined threshold, but does not otherwise. This is because in a case where the another excavator 100 exists at a relatively distant position, data from the surround view monitor sensor of the another excavator 100 contains only data of an object that is at a position relatively distant from the subject machine, and the value of use is relatively low. Thus, it is possible to improve the safety of the excavator 100 while suppressing the processing load on the controller 30.

The predetermined threshold is defined based on, for example, the sensing range of the surround view monitor sensor of the subject machine and the sensing range of the surround view monitor sensor of another excavator 100. In a case where the subject machine is equipped with a plurality of types of surround view monitor sensors, the predetermined threshold may be defined based on the sensing range of one of the surround view monitor sensors that has a smaller sensing range. The same may apply to another excavator 100. Specifically, the predetermined threshold may be a sum of the shortest distance between the subject machine and the border of the sensing range of its surround view monitor sensor as seen in a top view, and the shortest distance between another excavator 100 and the border of the sensing range of its surround view monitor sensor as seen in a top view. The predetermined threshold may also be a value obtained by subtracting a predetermined allowance from the sum. The predetermined threshold may also be a sum of a distance required to ensure safety, which is previously prescribed for the subject machine, and the shortest distance between another excavator 100 and the border of the sensing range of its surround view monitor sensor as seen in a top view, or a value obtained by subtracting a predetermined allowance from the sum. Thus, in a case where the subject machine is not equipped with the surround view monitor sensor, it is possible to appropriately define the predetermined threshold.

In addition, the predetermined threshold may be varied depending on the moving state of the subject machine. For example, the predetermined threshold when the subject machine is moving is set to be higher than that when it is not. For example, the predetermined threshold when the subject machine is moving toward another excavator 100 is set to be higher than that when the subject machine is not moving toward another excavator. In addition, the predetermined threshold may be set to increase in proportion to the increase in the moving speed of the subject machine. Thus, in a situation in which, for example, the subject machine moves and may approach another excavator 100, the object detecting part 303 can use data from the surround view monitor sensor of the another excavator 100 including data on objects around the another excavator 100 at an earlier timing. Therefore, the excavator 100 can more appropriately monitor objects around the excavator 100 on the premise that the processing load on the controller 30 should be suppressed as much as possible.

For example, when another excavator 100 can be detected based on output data of the surround view monitor sensor of the subject machine, the object detecting part 303 uses data from the surround view monitor sensor of the another excavator 100, but does not in other cases. This is because when no other excavator 100 can be detected based on output data of the surround view monitor sensor of the subject machine, the distance between the subject machine and any other excavator 100 may be relatively large, and also because in such a case, there may be a shielding object between the subject machine and any other excavator 100, and as a result, data from the surround view monitor sensor of any other excavator 100 may not include data on objects around the subject machine.

As in the case of the object detecting part 303, the display processing part 302 may switch between causing and not causing the display device 50A to display a surround view image of the subject machine based on an image from the imaging device 40 of another excavator 100 depending on the positional relationship between the subject machine and the another excavator 100. Similarly, the display processing part 302 may switch between causing and not causing the display device 50A to display a three-dimensional image representing the position and the shape of an object around the subject machine based on data from the distance sensor 45 of another excavator 100 depending on the positional relationship between the subject machine and the another excavator 100. Further, data from the surround view monitor sensor of another excavator 100 being provided and not being provided to the subject machine from the another excavator 100 may be switched depending on the positional relationship between the subject machine and the another excavator 100. That is, the data transmitting part 301 may switch between transmitting and not transmitting data from the surround view monitor sensor to another excavator 100 depending on the positional relationship between the subject machine and the another excavator 100.

The position locating part 304 locates the position at which a monitor-target object detected by the object detecting part 303 actually exists (hereinafter, "actual existence position") as seen from the subject machine.

For example, the position locating part 304 locates the actual existence position of the detected monitor-target object based on the position and the size of a partial region corresponding to the detected monitor-target object in an image from the camera 40X of the subject machine. When the camera 40X is a 3D camera, the position locating part 304 may locate the actual existence position of the detected monitor-target object based on subject machine-based coordinate information of a partial region (group of pixels) corresponding to the detected monitor-target object in an image from the camera 40X. The position locating part 304 may locate the actual existence position of the detected monitor-target object in the same manner as in the case of the 3D camera, by applying a sensor fusion technique to data from the camera 40X and the distance sensor 45X of the subject machine.

For example, the position locating part 304 locates the actual existence position of the detected monitor-target object based on the coordinate information of the detected monitor-target object part in three-dimensional data of objects around the subject machine, the three-dimensional data being generated based on output data of the distance sensor 45X of the subject machine.

Also, for example, the position locating part 304 locates the actual existence position of the detected monitor-target object based on the position and the size of a partial region corresponding to the detected monitor-target object in an image from the camera 40X of another excavator 100 and the relative position between the subject machine and the another excavator 100. Specifically, the position locating part 304 may locate the position of the monitor-target object as seen from the another excavator 100 based on the position and the size of the partial region corresponding to the detected monitor-target object in the image from the camera 40X of the another excavator 100. Then, the position locating part 304 may locate the actual existence position of the detected monitor-target object by converting the position of the monitor-target object seen from the another excavator 100 to the position of the monitor-target object seen from the subject machine based on the relative position between the subject machine and the another excavator 100.

In a case where the camera 40X of the another excavator 100 is a 3D camera, the position locating part 304 may locate the actual existence position of the detected monitor-target object based on the another excavator 100-based coordinate information data of the partial region (a group of pixels) corresponding to the detected monitor-target object in the image from the camera 40X and the relative position between the subject machine and the another excavator 100. The position locating part 304 may locate the actual existence position of the detected monitor-target object based on the corrected data of the camera 40X (3D camera). That is, the position locating part 304 may locate the actual existence position of the detected monitor-target object based on subject machine-based coordinate information data of the partial region (a group of pixels) corresponding to the detected monitor-target object in the image from the camera 40X of the another excavator 100.

For example, the position locating part 304 locates the actual existence position of the detected object based on data from the distance sensor 45X of another excavator 100 and the relative position between the subject machine and the another excavator 100. Specifically, the position locating part 304 may locate the position of the detected monitor-target object with respect to the another excavator 100 based on the coordinate information of the monitor-target object in three-dimensional data of objects around the another excavator 100, the three-dimensional data being generated based on the output data of the distance sensor 45X of the another excavator 100. Then, the position locating part 304 may locate the actual existence position of the detected monitor-target object by converting the position of the monitor-target object with respect to the another excavator 100 to the position of the monitor-target object with respect to the subject machine based on the relative position between the subject machine and the another excavator 100.

The position locating part 304 may locate the actual existence position of the detected monitor-target object based on corrected data of the distance sensor 45X of another excavator 100, that is, coordinate information of the detected monitor-target object in three-dimensional data corrected to a subject machine-based coordinate system.

The position locating part 304 also locates the actual existence position of the detected monitor-target object in the same manner as in the case of a 3D camera, for example, by applying a sensor fusion technique to data from the camera 40X and the distance sensor 45X of another excavator 100.

The safety control part 305 controls the safety of the functions of the excavator 100.

The safety control part 305 activates the safety function when, for example, the object detecting part 303 detects a monitor-target object within a predetermined range around the excavator 100 (subject machine). Specifically, the safety control part 305 may activate the safety function when the actual existence position of the monitor-target object located by the position locating part 304 is within a predetermined range around the excavator 100.

The safety function may include, for example, a reporting function for outputting an alarm or the like to at least one selected from the inside of the cabin 10, the outside of the cabin 10, and a remote operator, or a supervisor or the like of the excavator 100, and reporting detection of a monitor-target object. As a result, it is possible to alert an operator inside the cabin 10, a worker around the excavator 100, an operator, or a supervisor or the like remotely operating or remotely monitoring the excavator 100 that a monitor-target object exists in the monitoring area around the excavator 100. Hereinafter, the reporting function to the inside of the cabin 10 (an operator or the like), the reporting function to the outside of the excavator 100 (a worker or the like), and the reporting function to the operator or the supervisor remotely operating or remotely monitoring the excavator 100 may be distinguished from each other by referring to them as "internal reporting function", "external reporting function", and "remote reporting function", respectively.

Further, the safety function may include, for example, a movement restriction function for restricting a movement of the excavator 100 that is subject to an operation command corresponding to an operation via the operation device 26, a remote operation, or the automatic drive function. As a result, the movement of the excavator 100 may be forcibly restricted to reduce the possibility of approaching, contact, or the like between the excavator 100 and surrounding objects. The movement restriction function may include a movement deceleration function for reducing the speed of a movement of the excavator 100 subject to an operation command corresponding to an operation via the operation device 26, a remote operation, or the automatic drive function to a lower speed than usual. The movement restriction function may also include a movement stop function for stopping a movement of the excavator 100 and maintaining the stopped state regardless of an operation command corresponding to an operation via the operation device 26, a remote operation, or the automatic drive function.

The safety control part 305 activates the reporting function when, for example, the object detecting part 303 detects a monitor-target object in a predetermined range (hereinafter, "reporting range") around the excavator 100. The reporting range is, for example, a range in which the distance D from a predetermined part of the excavator 100 is less than or equal to a threshold Dth1. The predetermined part of the excavator 100 is, for example, the upper turning body 3. The predetermined part of the excavator 100 may be, for example, the bucket 6 or a hook at the tip of the attachment AT. The threshold Dth1 may be constant regardless of the direction viewed from the predetermined part of the excavator 100 or may vary depending on the direction viewed from the predetermined part of the excavator 100.

For example, by controlling the sound output device 50B, the safety control part 305 activates the internal reporting function or the external reporting function based on a sound (that is, an auditory method) to either or both of the inside and the outside of the cabin 10. Here, the safety control part 305 may vary the pitch, the sound pressure, and the sound tone of the output sound, the blowing cycle in a case of blowing the sound cyclically, the content of a speech, and the like depending on various conditions.

For example, the safety control part 305 also activates the internal reporting function by a visual method. Specifically, the safety control part 305 may control the display device 50A in the cabin 10 via the display processing part 302 to cause the display device 50A to display an image indicating that a monitor-target object is detected together with a surround view image. Further, via the display processing part 302, the safety control part 305 may emphasize the monitor-target object reflected in the surround view image displayed on the display device 50A in the cabin 10 or the position on the surround view image corresponding to the detected monitor-target object. More specifically, the safety control part 305 may cause a frame enclosing the detected monitor-target object to be superimposed and displayed on the surround view image displayed on the display device 50A in the cabin 10 or a marker to be superimposed and displayed on the position on the surround view image corresponding to the actual existence position of the detected monitor-target object. Thus, the display device 50A can realize a visual reporting function for reporting to the operator. In addition, the safety control part 305 may report the operator or the like in the cabin 10 that a monitor-target object is detected by using a warning light, a lighting device, or the like in the cabin 10.

In addition, the safety control part 305 may activate the external reporting function by a visual method by, for example, controlling the output device 50 (for example, a lighting device such as a headlight, and the display device 50A) provided on the side surfaces or the like of the house part of the upper turning body 3. In addition, the safety control part 305 may activate the internal reporting function by a tactile method by, for example, controlling a vibration generating device configured to vibrate the cockpit where the operator is seated. As a result, the controller 30 can make the operator, and a worker, a supervisor, or the like around the excavator 100 aware that a monitor-target object (for example, a person such as a worker) exists in a relatively close place around the excavator 100. Therefore, the controller 30 can prompt the operator to confirm the safety matters around the excavator 100, and can prompt the worker or the like in the monitoring area to evacuate from the monitoring area.

The safety control part 305 may also activate the remote reporting function by, for example, transmitting a command signal indicating the activation of the reporting function to the remote operation assisting device 200 or the remote monitor assisting device via the communication device 60. In this case, in response to receiving the command signal from the excavator 100, the remote operation assisting device 200 or the remote monitor assisting device may output an alarm by a visual method or an auditory method. Thus, an operator or a supervisor remotely operating or remotely monitoring the excavator 100 via the remote operation assisting device 200 can know that a monitor-target object has entered the reporting range around the excavator 100.

The remote reporting function of the safety control part 305 may be relegated to the remote operation assisting device 200 or the remote monitor assisting device. In this case, the remote operation assisting device 200 or the remote monitor assisting device receives from the excavator 100 information about the detection status of any monitor-target object by the object detecting part 303 and the result of locating the actual existence position of any monitor-target object by the position locating part 304. Based on the received information, the remote operation assisting device 200 determines whether or not a monitor-target object has entered the reporting range and activates the remote reporting function in a case where the monitor-target object exists in the reporting range.

The safety control part 305 may vary the reporting mode (that is, the method of reporting) depending on the positional relationship between the monitor-target object detected in the reporting range and the upper turning body 3.

For example, when the monitor-target object detected by the object detecting part 303 within the reporting range exists at a position relatively far from a predetermined part of the excavator 100, the safety control part 305 may output an alert of a relatively low urgency that is only a level of urging attention to the monitor-target object (hereinafter, "alert of the attention level"). Hereinafter, the range within the reporting range where the distance to the predetermined part of the excavator 100 is relatively far, that is, the range corresponding to the alert of the attention level, may be, for the sake of expedience, referred to as the "attention-level reporting range". On the other hand, when the monitor-target object detected within the reporting range by the object detection part 303 exists at a position relatively close to the predetermined part of the excavator 100, the safety control part 305 may output an alert of a relatively high urgency (hereinafter, "alert of the caution level") to inform that the monitor-target object is approaching the predetermined part of the excavator 100 and the danger level is increasing. Hereinafter, the range within the reporting range where the distance to the predetermined part of the excavator 100 is relatively close, that is, the range corresponding to the alert of the caution level, may be referred to as the "caution-level reporting range".

In this case, the safety control part 305 may make the pitch, the sound pressure, the sound tone, the blowing cycle, and the like of a sound that is output from the sound output device 50B vary between the alert of the attention level and the alert of the caution level. In addition, the safety control part 305 may make the color, the shape, the size, the presence or absence of flashing, the flashing cycle, and the like of an image indicating that the monitor-target object displayed on the display device 50A is detected, or an image (for example, a frame, a marker, and the like) emphasizing the monitor-target object or the position of the monitor-target object on the surround view image displayed on the display device 50A vary between the alert of the attention level and the alert of the caution level. Thus, the controller 30 can make the operator or the like understand the degree of urgency, in other words, the degree of approaching of the monitor-target object to the predetermined part of the excavator 100, depending on differences in reporting sounds (alerting sounds) output from the sound output device 50B or reporting images displayed on the display device 50A.

After the start of the activation of the reporting function, the safety control part 305 may stop the reporting function when the monitor-target object detected by the object detecting part 303 is no longer detected within the reporting range. Further, the safety control part 305 may stop the reporting function when a predetermined input to cancel the activation of the reporting function is received via the input device 52 after the start of the activation of the reporting function.

The safety control part 305 also activates the movement restriction function when, for example, a monitor-target object is detected by the object detecting part 303 within a predetermined range (hereinafter, "movement restriction range") around the excavator 100. For example, the movement restriction range is set to be the same as the reporting range described above. For example, the movement restriction range may be set to be a range of which the border is relatively closer to a predetermined part of the excavator 100 than that of the reporting range is. Thus, the safety control part 305 may, for example, first activate the reporting function when the monitor-target object enters the reporting range from outside, and then further activate the movement restriction function when the monitor-target object enters the inside movement restriction range. Therefore, the controller 30 can activate the reporting function and the movement restriction function stepwise in accordance with the movement of the monitor-target object inward in the monitoring area.

Specifically, the safety control part 305 may activate the movement restriction function when the monitor-target object is detected at a position within the movement restriction range at which the distance D from the predetermined part of the excavator 100 is within the threshold Dth2 (≤ Dth1). The threshold Dth2 may be constant regardless of the direction viewed from the predetermined part of the excavator 100 or may vary depending on the direction viewed from the predetermined part of the excavator 100.

The movement restriction range includes either or both of a movement deceleration range in which the speed of a movement of the excavator 100 that is subject to an operation command corresponding to an operation via the operation device 26, a remote operation, and the automatic drive function is reduced to a lower speed than usual, and a movement stop range in which a movement of the excavator 100 is stopped and the stopped state is maintained regardless of an operation command corresponding to an operation via the operation device 26, a remote operation, and the automatic drive function. For example, when the movement restriction range includes both the movement deceleration range and the movement stop range, the movement stop range is a range within the movement restriction range that is closer to the predetermined part of the excavator 100. The movement deceleration range is a range that is set outside the movement stop range within the movement restriction range.

The safety control part 305 activates the movement restriction function for restricting a movement of the excavator 100 by controlling the hydraulic control valve 31. In this case, the safety control part 305 may restrict movements of all drive-target components (that is, corresponding hydraulic actuators) or may restrict movements of some drive-target components (hydraulic actuators). As a result, the controller 30 can decelerate or stop the movement of the excavator 100 when there is a monitor-target object around the excavator 100. Therefore, the controller 30 can inhibit the occurrence of a contact between the monitor-target object around the excavator 100 and the excavator 100 or its suspended load. In addition, the safety control part 305 may activate the movement restriction function (movement stop function) by controlling an electromagnetic switching valve (not illustrated) of the pilot line 25 to block the pilot line 25.

The safety control part 305 may stop the movement restriction function when the monitor-target object detected by the object detecting part 303 is no longer detected within the movement restriction range after the movement restriction function has started. The safety control part 305 may stop the movement restriction function when a predetermined input to cancel the activation of the movement restriction function is received via the input device 52 after the movement restriction function has started. The contents of the input into the input device 52 for canceling the activation of the reporting function and the contents of the input to cancel the activation of the movement restriction function may be the same or different.

The safety control part 305 may switch its functioning between ON (active) and OFF (inactive) in response to a predetermined input by an operator or the like into the input device 52.

[Specific Example of Mode of Use of Data from Surround View Monitor Sensors of Other Excavators]

Next, a specific example of a mode of use of data from the surround view monitor sensors of other excavators 100 will be described with reference to FIGS. 9 to 14.

Example 1

Figure 9:
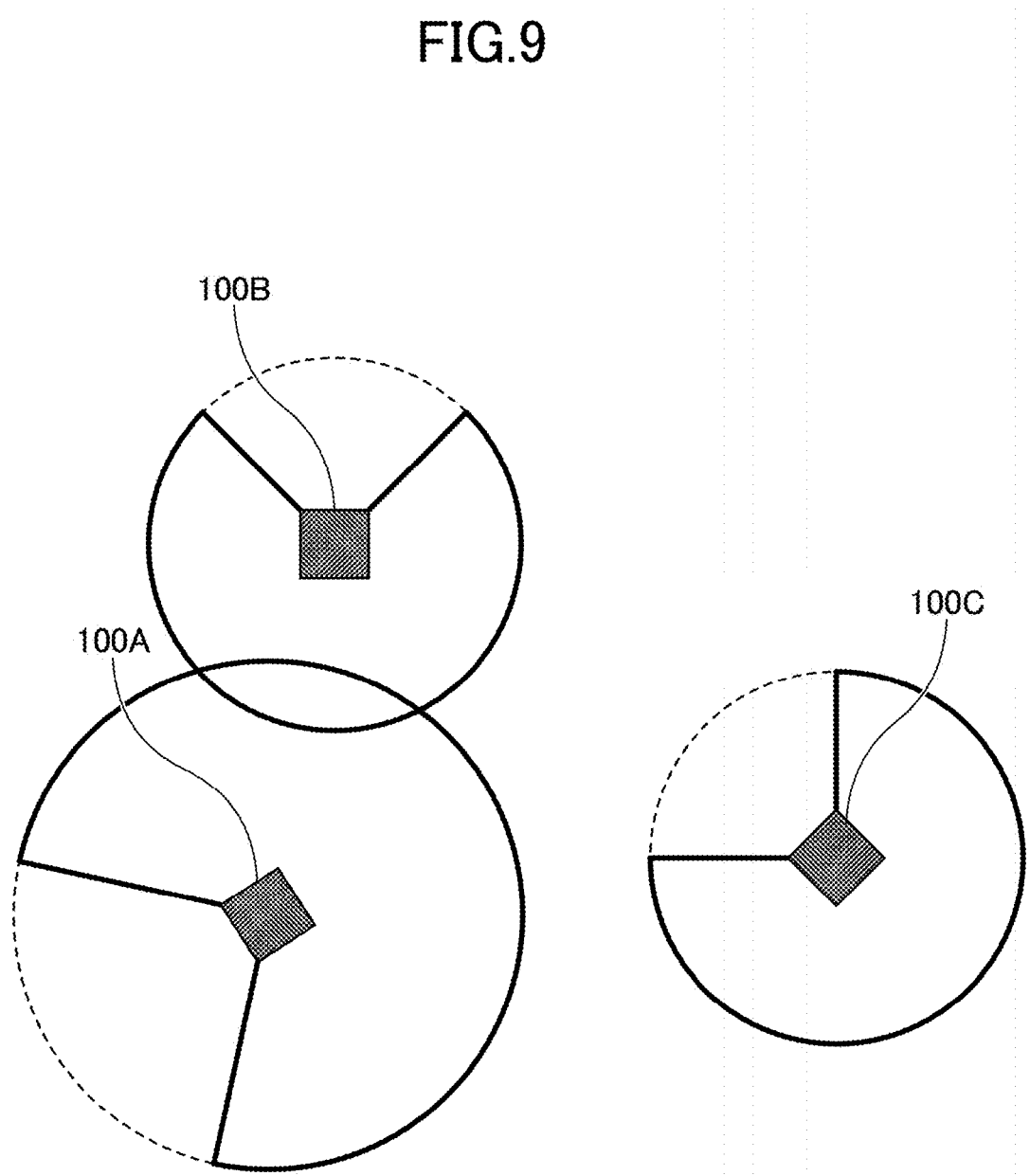
FIG. 9 is a diagram illustrating a first example of the use of a surround view monitor sensor of another excavator.
Figure 10:
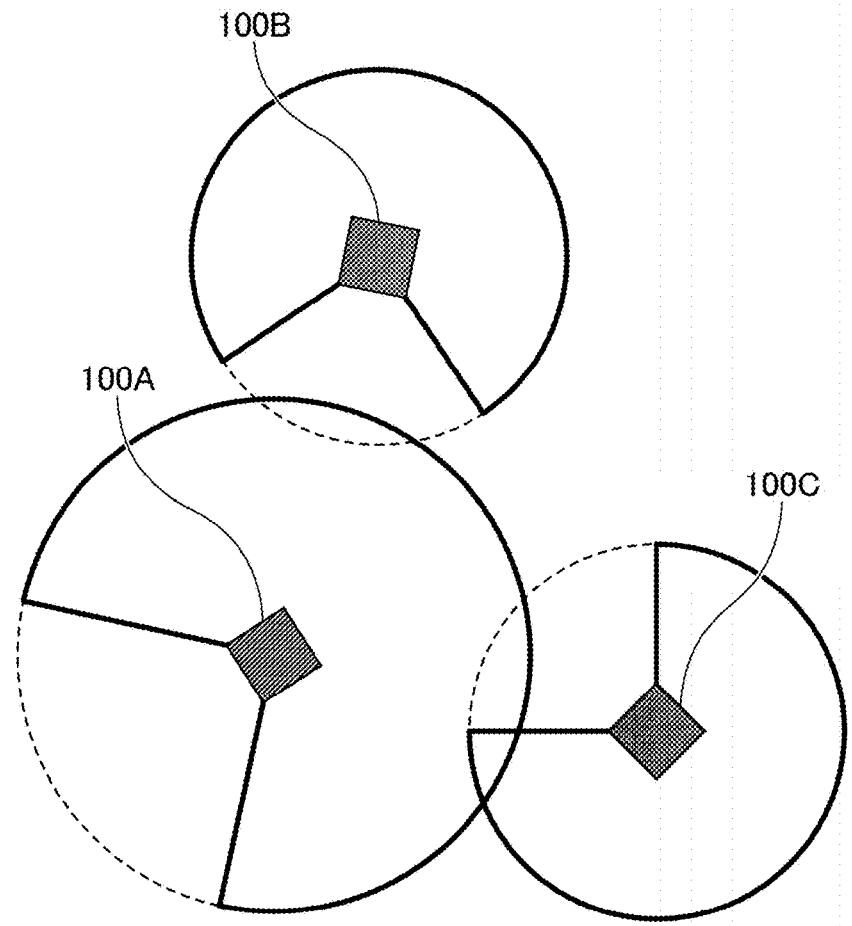
FIG. 10 is a diagram illustrating a first example of a form of use of a surround view monitor sensor of another excavator.

FIGS. 9 and 10 are diagrams illustrating a first example of a mode of use of data from the surround view monitor sensors of other excavators 100. Specifically, FIGS. 9 and 10 are simplified illustrations of states of three excavators 100 performing work, viewed from directly above the work site WS.

In this example, the three excavators 100 are distinguished for the sake of expedience as excavators 100A to 100C. In this example, the object detecting part 303 uses data from the surround view monitor sensors of the other excavators 100 when the distance between the subject machine and the other excavators 100 is less than or equal to the predetermined threshold. In this example, the predetermined threshold is defined based on the sensing range of the surround view monitor sensor of the subject machine and the sensing range of the surround view monitor sensors of the other excavators 100.

The radius of the circles centered about the excavators 100A to 100C in FIGS. 9 and 10 corresponds to the shortest distance between the excavators 100A to 100C and the border of the sensing range of the surround view monitor sensor thereof. The solid arc parts centered about the excavators 100A to 100C in FIGS. 8 and 9 correspond to the sensing angular direction ranges, centered about the excavators 100A to 100C, of their surround view monitor sensors. Further, the dashed arc parts centered about the excavators 100A to 100C in FIGS. 9 and 10 correspond to the unsensable angular direction ranges, centered about the excavators 100A to 100C, of their surround view monitor sensors. That is, in this example, the excavators 100A to 100C are mounted with the surround view monitor sensor so as to be able to sense an angular direction range spreading from the left side of each excavator to the right side thereof via the rear side when seen in a top view.

As illustrated in FIGS. 9 and 10, the three excavators 100A to 100C can move in the work site WS. Therefore, the positional relationship between the three excavators 100A to 100C changes.

For example, as illustrated in FIG. 9, in this situation, the excavators 100A and 100B perform work at relatively close positions, while the excavator 100C performs work at a relatively distant position from the excavators 100A and 100B. Specifically, the circle centered about the excavator 100A and the circle centered about the excavator 100B intersect at two points, whereas the circle centered about the excavator 100C does not intersect the circles centered about the excavators 100A and 100B. In this case, the distance between the excavators 100A and 100B is smaller than or equal to a predetermined threshold, or is smaller than the predetermined threshold, whereas the distance between the excavators 100A and 100C and the distance between the excavators 100B and 100C are larger than the predetermined threshold, or are larger than or equal to the predetermined threshold, respectively. Therefore, the excavator 100A can acquire data from the surround view monitor sensor of the excavator 100B from the excavator 100B and use it. Therefore, the object detecting part 303 of the excavator 100A can detect not only the monitor-target object in the sensing range of the surround view monitor sensor of the excavator 100A but also the monitor-target object in the sensing range of the surround view monitor sensor of the excavator 100B. Similarly, the excavator 100B can acquire and use data from the surround view monitor sensor of the excavator 100A. Therefore, the object detecting part 303 of the excavator 100B can detect not only the monitor-target object in the sensing range of the surround view monitor sensor of the excavator 100B but also the monitor-target object in the sensing range of the surround view monitor sensor of the excavator 100A.

For example, in the situation illustrated in FIG. 10, the excavators 100A and 100B, and the excavators 100A and 100C are working at relatively close positions, while the excavators 100B and 100C are working at relatively distant positions. Specifically, the circles centered about the excavators 100A and 100B intersect at two points, and the circles centered about the excavators 100A and 100C intersect at two points. On the other hand, the circles centered about the excavators 100B and 100C do not intersect at all. In this case, the distance between the excavators 100A and 100B and the distance between the excavators 100A and 100C are smaller than or equal to the predetermined threshold, or are smaller than the predetermined threshold, whereas the distance between the excavators 100B and 100C is larger than the predetermined threshold, or is larger than or equal to the predetermined threshold. Therefore, the excavator 100A can acquire and use data from the surround view monitor sensor of the excavator 100B and data from the surround view monitor sensor of the excavator 100C. Therefore, the object detecting part 303 of the excavator 100A can detect not only the monitor-target object in the sensing range of the surround view monitor sensor of the excavator 100A but also the monitor-target objects in the sensing ranges of the surround view monitor sensors of the excavators 100B and 100C. The excavator 100B can acquire and use data from the surround view monitor sensor of the excavator 100A. Therefore, the object detecting part 303 of the excavator 100B can detect not only the monitor-target object in the sensing range of the surround view monitor sensor of the excavator 100B but also the monitor-target object in the sensing range of the surround view monitor sensor of the excavator 100A. In addition, the excavator 100C can acquire and use data from the surround view monitor sensor of the excavator 100A. Therefore, the object detecting part 303 of the excavator 100C can detect not only the monitor-target object in the sensing range of the surround view monitor sensor of the excavator 100C, but also the monitor-target object in the sensing range of the surround view monitor sensor of the excavator 100A.

As described above, in this example, the excavators 100A to 100C switch between using and not using data from the surround view monitor sensors of the other excavators 100 in accordance with changes in the positional relationship between the subject machine and the other excavators 100 along with their movements in the work site WS. Thus, the excavators 100A to 100C can improve the safety of the subject machines while suppressing the processing load on the controller 30 of the subject machines, respectively.

Example 2

Figure 11:
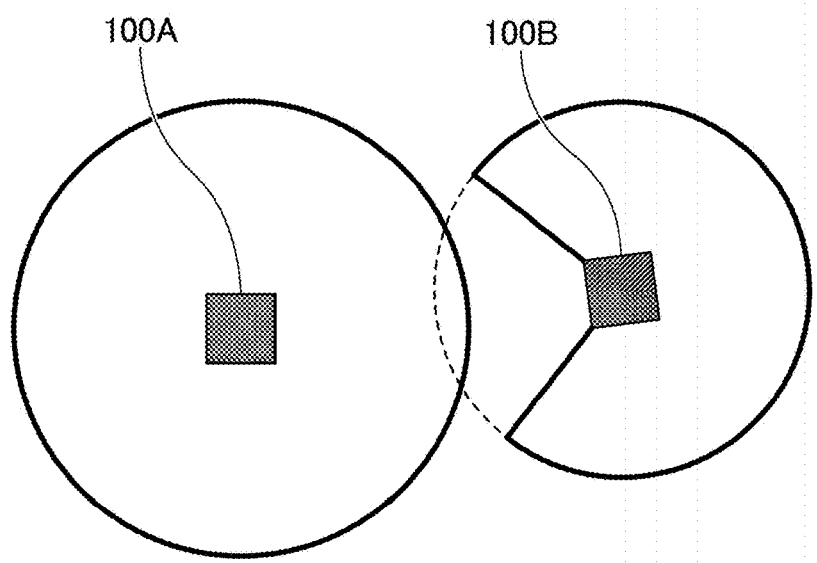
FIG. 11 is a diagram illustrating a second example of a form of use of a surround view monitor sensor of another excavator.

FIG. 11 is a diagram illustrating a second example of a mode of use of data from a surround view monitor sensor of another excavator 100. Specifically, FIG. 11 is a simplified illustration of states of two excavators 100 performing work, viewed from directly above the work site WS.

In this example, the two excavators 100 are distinguished for the sake of expedience as excavators 100A and 100B. In this example, as in the case of the first example described above, the object detecting part 303 uses data from the surround view monitor sensor of another excavator 100 when the distance between the subject machine and the another excavator 100 is less than or equal to the predetermined threshold, or is less than the predetermined threshold. In this example, as in the case of the first example described above, the predetermined threshold is defined based on the sensing range of the surround view monitor sensor of the subject machine and the sensing range of the surround view monitor sensor of the another excavator 100.

The radius of the circles centered about the excavators 100A and 100B in FIG. 11 corresponds to the shortest distance between the excavators 100A and 100B and the border of the sensing range of their surround view monitor sensors. The solid arc parts centered about the excavators 100A and 100B in FIG. 11 correspond to the sensing angular direction ranges, centered about the excavators 100A and 100B, of their surround view monitor sensors. The dashed arc part centered about the excavator 100B in FIG. 11 corresponds to the unsensable angular direction range, centered about the excavator 100B, of its surround view monitor sensor. In other words, in this example, the excavator 100A is equipped with a surround view monitor sensor so as to be able to sense an angular direction range covering the whole surroundings centered about the subject machine when seen in a top view. The excavator 100B is equipped with a surround view monitor sensor so as to be able to sense an angular direction range that spreads from the left side to the right side via the rear side when seen in a top view.

As illustrated in FIG. 11, in this situation, the excavators 100A and 100B perform work at relatively close positions. Specifically, the circles centered about the excavators 100A and 100B intersect at two points.

In this case, the distance between the excavators 100A and 100B is smaller than or equal to the predetermined threshold, or is smaller than the predetermined threshold. Therefore, the excavator 100A can acquire and use data from the surround view monitor sensor of the excavator 100B. Therefore, the object detecting part 303 of the excavator 100A can detect not only the monitor-target object in the sensing range of the surround view monitor sensor of the excavator 100A, but also the monitor-target object in the sensing range of the surround view monitor sensor of the excavator 100B. In addition, the excavator 100B can acquire and use data from the surround view monitor sensor of the excavator 100A. Therefore, the object detecting part 303 of the excavator 100B can detect not only the monitor-target object in the sensing range of the surround view monitor sensor of the excavator 100B but also the monitor-target object in the sensing range of the surround view monitor sensor of the excavator 100A.

In the present example, as described above, the surround view monitor sensor of the excavator 100B cannot acquire data on any object present in front of the excavator 100, but there is a sensing range of the surround view monitor sensor of the excavator 100A in front of the excavator 100B. Therefore, the object detecting part 303 of the excavator 100B can detect the monitor-target object in front of the excavator 100B by using not only data from the surround view monitor sensor of the excavator 100B but also data from the surround view monitor sensor of the excavator 100A.

Thus, in this example, the excavator 100B can monitor any monitor-target object in the blind area of the surround view monitor sensor of the subject machine (the excavator 100B) by using data from the surround view monitor sensor of the excavator 100A. That is, the blind area of the surround view monitor sensor of the excavator 100B can be complemented by the surround view monitor sensor of the excavator 100A. Therefore, it is possible to expand the surrounding object monitorable range of the excavator 100B without increasing costs due to increasing the number of surround view monitor sensors on the excavator 100B or the like. Therefore, it is possible to improve the safety of the excavator 100 (excavator 100B) included in the surround view monitor system SYS while inhibiting cost increase.

Example 3

Figure 12:
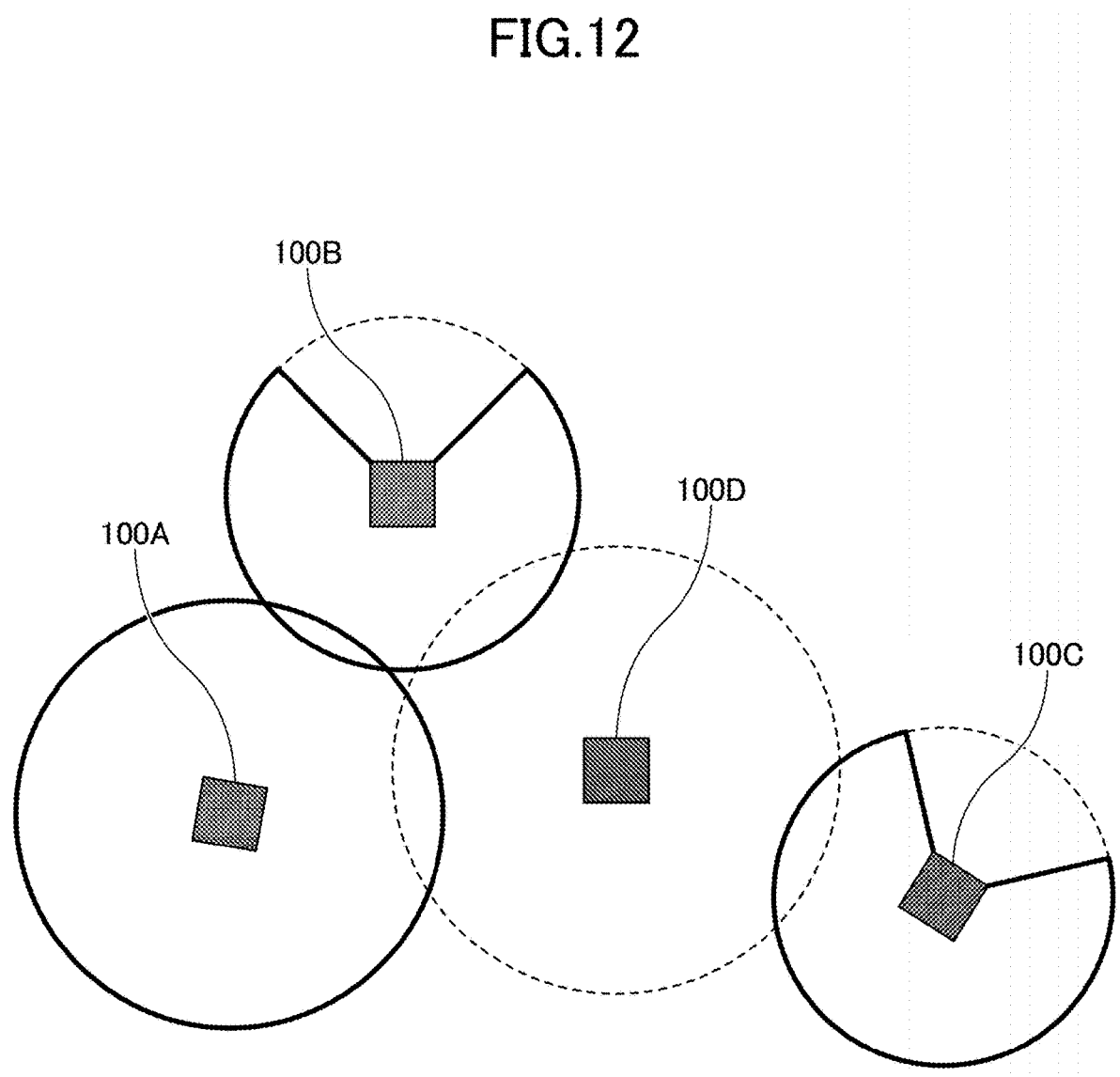
FIG. 12 is a diagram illustrating a third example of a form of use of a surround view monitor sensor of another excavator.

FIG. 12 is a diagram illustrating a third example of a mode of use of data from the surround view monitor sensors of other excavators 100. Specifically, FIG. 12 is a simplified illustration of states of four excavators 100 performing work, viewed from directly above the work site WS.

In this example, the four excavators 100 are distinguished for the sake of expedience as excavators 100A to 100D. In this example, as in the case of the first example and the like described above, the object detecting part 303 uses data from the surround view monitor sensors of the other excavators 100 when the distance between the subject machine and the other excavators 100 is less than or equal to the predetermined threshold, or is less than the predetermined threshold. In this example, as in the case of the first example and the like described above, the predetermined threshold is defined based on the sensing range of the surround view monitor sensor of the subject machine and the sensing range of the surround view monitor sensors of the other excavators 100.

The radius of the circles centered about the excavators 100A to 100C in FIG. 12 corresponds to the shortest distance between the excavators 100A to 100C and the border of the sensing range of their surround view monitor sensors. In addition, the radius of the circle centered about the excavator 100D in FIG. 12 corresponds to the distance required to ensure safety that is previously prescribed for the excavator 100D. The solid arc parts centered about the excavators 100A to 100C in FIG. 12 correspond to the sensing angular direction ranges, centered about the excavators 100A to 100C, of their surround view monitor sensors. In addition, the dashed arc parts centered about the excavators 100B to 100D in FIG. 12 correspond to the unsensable angular direction ranges, centered about the excavators 100B to 100D, of their surround view monitor sensors. That is, in this example, the excavator 100A is equipped with a surround view monitor sensor so as to be able to sense an angular direction range covering the whole surroundings centered about the subject machine when seen in a top view. The excavators 100B and 100C are equipped with surround view monitor sensors so as to be able to sense an angular direction range spreading from the left side to the right side via the rear side when seen in a top view. The excavator 100D is not equipped with a surround view monitor sensor.

As illustrated in FIG. 12, in this situation, the excavators 100A and 100B, the excavators 100A and 100D, the excavators 100B and 100D, and the excavators 100C and 100D are working at relatively close positions, respectively. On the other hand, the excavators 100A and 100C and the excavators 100B and 100C are working at relatively distant positions. Specifically, the circles centered about the excavators 100A and 100B intersect at two points. Similarly, the circles centered about the excavators 100A and 100D intersect at two points. Similarly, the circles centered about the excavators 100B and 100D intersect at two points. Similarly, the circles centered about the excavators 100C and 100D intersect at two points. On the other hand, the circles centered about the excavators 100A and 100C do not intersect at all. Similarly, the circles centered about the excavators 100B and 100C do not intersect at all.

In this case, the distance between the excavators 100A and 100B, the distance between the excavators 100A and 100D, the distance between the excavators 100B and 100D, and the distance between the excavators 100C and 100D are smaller than or equal to the predetermined threshold, or are smaller than the predetermined threshold, respectively. On the other hand, the distance between the excavators 100A and 100C and the distance between the excavators 100B and 100C are larger than the predetermined threshold, or are larger than or equal to the predetermined threshold, respectively. Therefore, the excavator 100A can acquire and use data from the surround view monitor sensor of the excavator 100B. Therefore, the object detecting part 303 of the excavator 100A can detect not only the monitor-target object in the sensing range of the surround view monitor sensor of the excavator 100A, but also the monitor-target object in the sensing range of the surround view monitor sensor of the excavator 100B. In addition, the excavator 100B can acquire and use data from the surround view monitor sensor of the excavator 100A. Therefore, the object detecting part 303 of the excavator 100B can detect not only the monitor-target object in the sensing range of the surround view monitor sensor of the excavator 100B but also the monitor-target object in the sensing range of the surround view monitor sensor of the excavator 100A. The excavator 100D can acquire and use data from the surround view monitor sensor of the excavator 100A, data from the surround view monitor sensor of the excavator 100B, and data from the surround view monitor sensor of the excavator 100C. Therefore, the object detecting part 303 of the excavator 100D can detect monitor-target objects within the sensing ranges of the surround view monitor sensors of the excavators 100A to 100C.

Thus, in this example, by using data from the surround view monitor sensors of the excavators 100A to 100C that exist around itself, the excavator 100D can monitor objects around itself even when it is not equipped with a surround view monitor sensor. Therefore, for example, when work is performed using an old-type excavator 100 that is not equipped with a surround view monitor sensor, combination with another excavator 100 that is equipped with a surround view monitor sensor can provide a surround view monitor function to the operator or a supervisor of the old-type excavator 100.

Example 4

Figure 13:
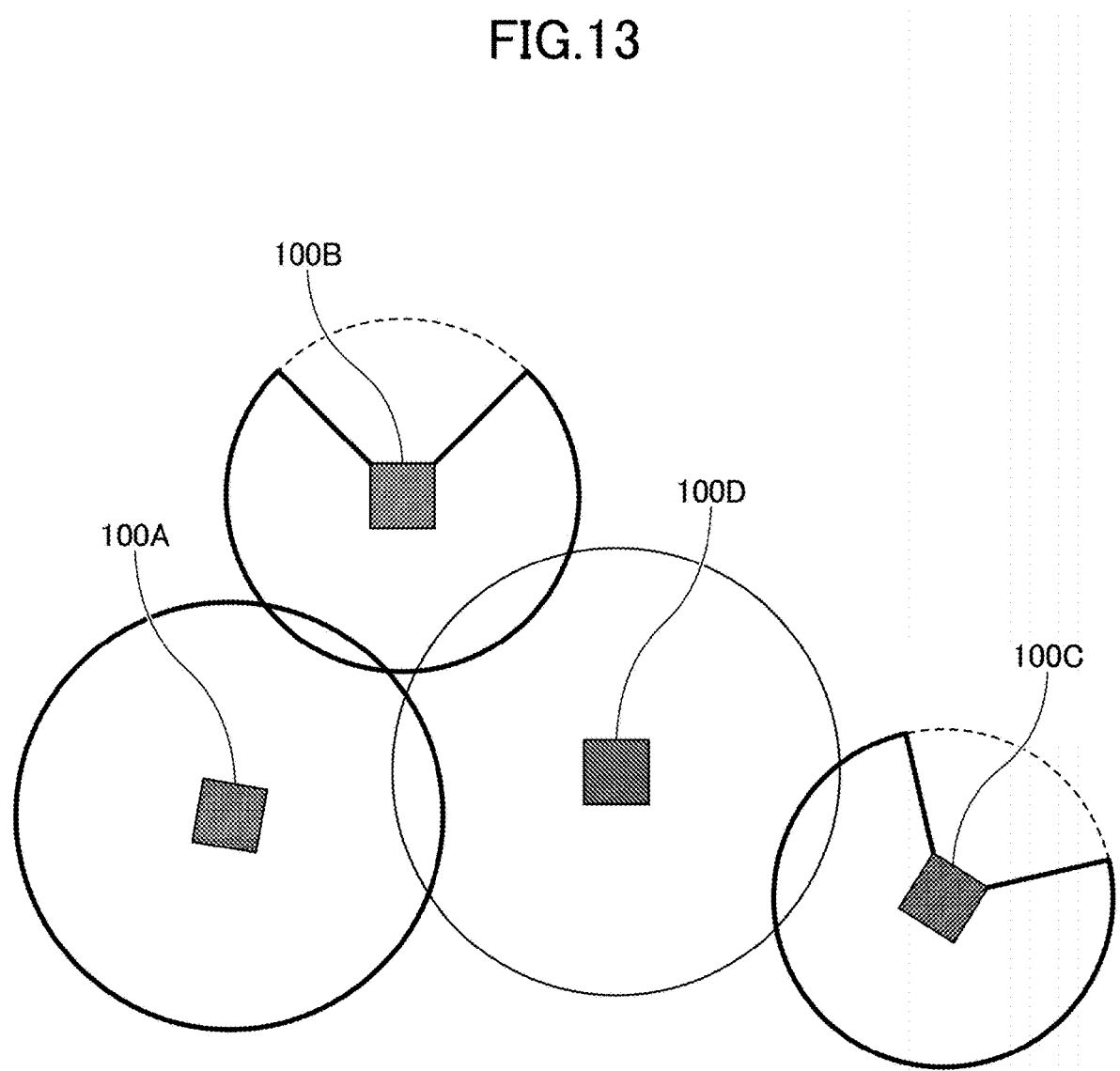
FIG. 13 is a diagram illustrating a fourth example of a form of use of a surround view monitor sensor of another excavator.

FIG. 13 is a diagram illustrating a fourth example of a mode of use of data from surround view monitor sensors of other excavators 100. Specifically, FIG. 13 is a simplified illustration of states of four excavators 100 performing work, viewed from directly above the work site WS.

In this example, the four excavators 100 are distinguished for the sake of expedience as excavators 100A to 100D. In addition, in this example, as in the case of the first example and the like described above, the object detecting part 303 utilizes data from the surround view monitor sensors of the other excavators 100 when the distance between the subject machine and the other excavators 100 is less than or equal to the predetermined threshold, or is less than the predetermined threshold. In this example, as in the case of the first example and the like described above, the predetermined threshold is defined based on the sensing range of the surround view monitor sensor of the subject machine and the sensing ranges of the surround view monitor sensors of the other excavators 100.

The radius of the circles centered about the excavators 100A to 100D in FIG. 13 corresponds to the shortest distance between the excavators 100A to 100D and the border of the sensing range of their surround view monitor sensor. Also, the solid arc parts centered about the excavators 100A to 100D in FIG. 13 correspond to the sensing angular direction ranges, centered about the excavators 100A to 100D, of their surround view monitor sensors. Further, the dashed arc parts centered about the excavators 100B and 100C in FIG. 13 correspond to the unsensable angular direction range, centered about the excavators 100B and 100C, of their surround view monitor sensor. That is, in this example, the excavators 100A and 100D are equipped with surround view monitor sensors so as to be able to sense an angular direction range covering the whole surroundings centered about the subject machines when seen in a top view. The excavators 100B and 100C are equipped with surround view monitor sensors so as to be able to sense an angular direction range spreading from the left side to the right side via the rear side when seen in a top view.

The bold solid line of the arcs of the excavators 100A to 100C in FIG. 13 indicates that the excavators 100A to 100C are equipped with a camera 40X and a distance sensor 45, and the thin solid line of the arc of the excavator 100D indicates that it is equipped with only a camera 40X.

As illustrated in FIG. 13, in this situation, the excavators 100A and 100B, the excavators 100A and 100D, the excavators 100B and 100D, and the excavators 100C and 100D are working at relatively close positions, respectively. On the other hand, the excavators 100A and 100C and the excavators 100B and 100C are working at relatively distant positions. Specifically, the circles centered about the excavators 100A and 100B intersect at two points. Similarly, the circles centered about the excavators 100A and 100D intersect at two points. Similarly, the circles centered about the excavators 100B and 100D intersect at two points. Similarly, the circles centered about the excavators 100C and 100D intersect at two points. On the other hand, the circles centered about the excavators 100A and 100C do not intersect at all. Similarly, the circles centered about the excavators 100B and 100C do not intersect at all.

In this case, the distance between the excavators 100A and 100B, the distance between the excavators 100A and 100D, the distance between the excavators 100B and 100D, and the distance between the excavators 100C and 100D are smaller than or equal to the predetermined threshold, or are smaller than the predetermined threshold, respectively. On the other hand, the distance between the excavators 100A and 100C and the distance between the excavators 100B and 100C are larger than the predetermined threshold, or are larger than or equal to the predetermined threshold, respectively. Therefore, the excavator 100A can acquire and use data from the surround view monitor sensor of the excavator 100B and data from the surround view monitor sensor of the excavator 100D. Therefore, the object detecting part 303 of the excavator 100A can detect not only the monitor-target object in the sensing range of the surround view monitor sensor of the excavator 100A, but also the monitor-target objects in the sensing ranges of the surround view monitor sensor of the excavator 100B and the surround view monitor sensor of the excavator 100D. In addition, the excavator 100B can acquire and use data from the surround view monitor sensor of the excavator 100A and data from the surround view monitor sensor of the excavator 100D. Therefore, the object detecting part 303 of the excavator 100B can detect not only the monitor-target object in the sensing range of the surround view monitor sensor of the excavator 100B, but also the monitor-target objects in the sensing ranges of the surround view monitor sensor of the excavator 100A and the surround view monitor sensor of the excavator 100D. In addition, the excavator 100C can acquire and use data from the surround view monitor sensor of the excavator 100D. Therefore, the object detecting part 303 of the excavator 100C can detect not only the monitor-target object in the sensing range of the surround view monitor sensor of the excavator 100C but also the monitor-target object in the sensing range of the surround view monitor sensor of the excavator 100D. In addition, the excavator 100D can acquire and use data from the surround view monitor sensor of the excavator 100A, data from the surround view monitor sensor of the excavator 100B, and data from the surround view monitor sensor of the excavator 100C. Therefore, the object detecting part 303 of the excavator 100D can detect not only the monitor-target object in the sensing range of the surround view monitor sensor of the excavator 100D but also the monitor-target objects in the sensing ranges of the surround view monitor sensors of the excavators 100A to 100C.

In this example, as described above, the excavator 100D is equipped with only the camera 40X as the surround view monitor sensor, but can acquire data from the distance sensors 45X of the excavators 100A to 100C. Therefore, even when the excavator 100D is equipped with only one type of a surround view monitor sensor, it can monitor objects around the subject machine by using data from two types of surround view monitor sensors. Therefore, the excavator 100D can improve the accuracy of object detection from around the subject machine, and as a result, can perform monitoring of the monitor-target objects around the subject machine more appropriately.

Example 5

Figure 14:
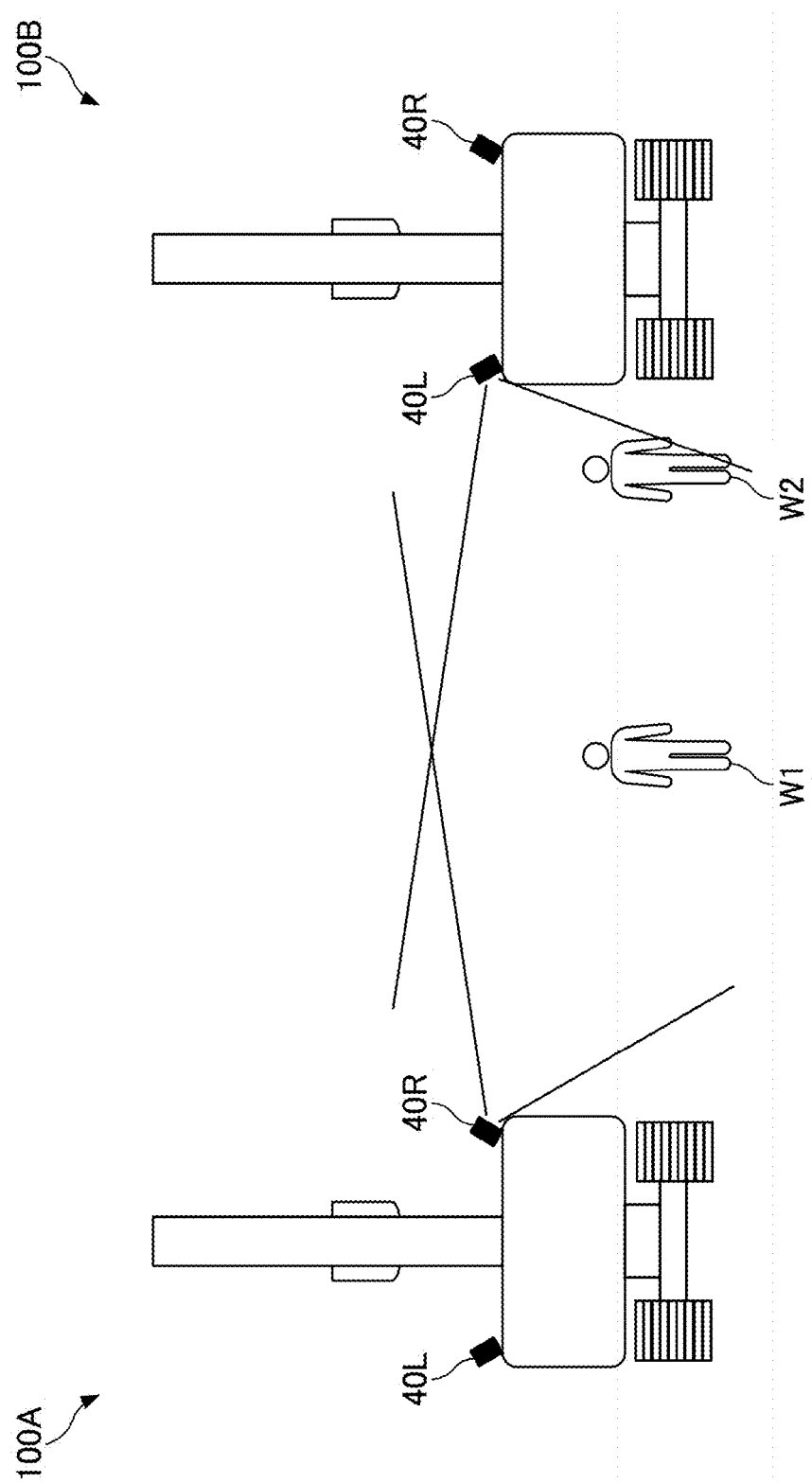
FIG. 14 is a diagram illustrating a fifth example of a form of use of a surround view monitor sensor of another excavator.

FIG. 14 is a diagram illustrating a fifth example of a mode of use of data from a surround view monitor sensor of another excavator 100. Specifically, FIG. 14 is a diagram illustrating states of two excavators 100 performing work, viewed from the rear side.

In this example, the two excavators 100 are distinguished for the sake of expedience as the excavators 100A and 100B. In FIG. 14, the imaging range (angle of view) of the camera 40R of the excavator 100A is denoted by two solid lines extending from the camera 40R. The same applies to the imaging range (angle of view) of the camera 40L of the excavator 100B.

As illustrated in FIG. 14, workers W1 and W2 exist between the excavators 100A and 100B.

The worker W1 exists between the excavators 100A and 100B in a region of the work site WS that is at some distances from both of the excavators 100A and 100B. In this case, as illustrated in FIG. 14, the camera 40R of the excavator 100A and the camera 40L of the excavator 100B can capture the worker W1 in the center of the vertical imaging range. Therefore, the object detecting part 303 of the excavator 100A can detect the worker W1 with a relatively high accuracy by using an image from the camera 40R of the subject machine. Similarly, the object detecting part 303 of the excavator 100B can detect the worker W1 with a relatively high accuracy by using an image from the camera 40L of the subject machine.

On the other hand, the worker W2 exists between the excavators 100A and 100B in a region of the work site WS that is very close to the excavator 100B. In this case, as illustrated in FIG. 14, the camera 40R of the excavator 100A can capture the worker W2 in the center of the vertical imaging range. Therefore, the object detecting part 303 of the excavator 100A can detect the worker W2 with a relatively high accuracy by using an image from the camera 40R of the subject machine. On the other hand, the camera 40L of the excavator 100B can capture the worker W2 near the border (lower end portion) of the vertical imaging range, but a part of the worker W2 gets outside of the imaging range. Therefore, when the object detecting part 303 of the excavator 100B uses an image from the camera 40L of the subject machine, the accuracy of object detection from the region near the border (lower end portion) of the vertical imaging range is relatively low, and the possibility that the worker W2 cannot be detected increases. Therefore, the object detecting part 303 of the excavator 100B preferentially uses the image from the camera 40R of the excavator 100A received from the excavator 100A. Thus, the object detecting part 303 of the excavator 100B can more reliably detect the worker W2 with a relatively high accuracy by using the image from the camera 40R of the excavator 100A.

Thus, in this example, when the object detecting part 303 of the excavator 100B attempts to detect any monitor-target object in a region near the lower end portion of the imaging range of the camera 40X of the subject machine, it preferentially uses the image from the camera 40X of the excavator 100A over the image from the camera 40X of the subject machine to detect any monitor-target object. As a result, the excavator 100B can more reliably detect the monitor-target object around the subject machine and, as a result, can more appropriately monitor the monitor-target object around the subject machine.

[Workings]

Next, the workings of the surround view monitor system SYS (excavator 100) according to the present embodiment will be described.

In the present embodiment, the surround view monitor system SYS includes a first work machine (for example, excavator 100) and an external surround view monitor sensor (for example, a camera 40X or a distance sensor 45X). Specifically, the first work machine includes a first communication device (for example, a communication device 60). The external surround view monitor sensor acquires data on an object around the first work machine. The first work machine acquires output data of the external surround view monitor sensor or processed data (output processed data) generated based on the output data of the external surround view monitor sensor via the first communication device.

Thus, the first work machine (excavator 100) can monitor the monitor-target object around itself (the first work machine) by using the data from the surround view monitor sensor external to itself. Therefore, for example, the first work machine can monitor the object around the first work machine even when it is not equipped with a surround view monitor sensor. Also, for example, the first work machine can monitor not only the object in the sensing range of its own surround view monitor sensor but also the object in the sensing range of the external surround view monitor sensor. Therefore, the surround view monitor system SYS can more appropriately monitor the objects around the first work machine.

In this embodiment, the output data or the output processed data of the external surround view monitor sensor may be source data based on which the object around the first work machine is detected.

Thus, the surround view monitor system SYS can detect the object around the first work machine by using the output data or the output processed data of the external surround view monitor sensor.

Further, in the present embodiment, the first work machine may include a first surround view monitor sensor (for example, a camera 40X or a distance sensor 45X) configured to acquire data on the object around itself (the first work machine).

Thus, the first work machine can monitor the objects around the first work machine by using both output data of its own surround view monitor sensor and output data or output processed data of the external surround view monitor sensor.

In this embodiment, the first work machine may transmit output data or output processed data of the first surround view monitor sensor to a second work machine (for example, another excavator 100) existing around itself (the first work machine) via the first communication device.

Thus, the second work machine can monitor the object around itself (the second work machine) by using the output data or the output processed data of the surround view monitor sensor (the first surround view monitor sensor) of the first work machine. Therefore, the surround view monitor system SYS can more appropriately monitor objects around both the first work machine and the second work machine.

In this embodiment, the type of the first surround view monitor sensor may be different from that of the external surround view monitor sensor.

Thus, the first work machine can monitor the object around itself (the first work machine) by using data of surround view monitor sensors of different types from each other. Therefore, for example, by applying a sensor fusion technique, the surround view monitor system SYS can more appropriately monitor the object around the first work machine.

In the present embodiment, in a top view of the first work machine, the sensing angular direction range of the first surround view monitor sensor centered about the first work machine may be smaller than 360 degrees.

Thus, the surround view monitor system SYS can complement the angular direction range corresponding to the blind spot region of the first surround view monitor sensor by data from the external surround view monitor sensor.

Further, in the present embodiment, the first work machine may include a detecting part (for example, an object detecting part 303) configured to detect monitor-target objects around itself (the first work machine). The detecting part may switch between detecting monitor-target objects around the subject machine (the first work machine) based on output data of the first surround view monitor sensor and detecting monitor-target objects around the subject machine (the first work machine) based on output data or output processed data of the external surround view monitor sensor in a region around the subject machine (the first work machine) in which the sensing ranges of the external surround view monitor sensor and the first surround view monitor sensor overlap.

Thus, for example, the first work machine can switch the data to be used for detecting the monitor-target object by taking into consideration the reliability of the data for detecting the object. Therefore, the surround view monitor system SYS can more appropriately monitor the object around the first work machine.

Further, in the present embodiment, in the region around the subject machine (the first work machine) in which the sensing ranges of the external surround view monitor sensor and the first surround view monitor sensor overlap, the detecting part may detect a monitor-target object around the subject machine (the first work machine) based on output data of the first surround view monitor sensor in a region in which the monitor-target object detection accuracy based on the output data of the first surround view monitor sensor is relatively high, and may detect a monitor-target object around the subject machine (the first work machine) based on output data or output processed data of the external surround view monitor sensor in a region in which the monitor-target object detection accuracy based on the output data of the first surround view monitor sensor is relatively low.

Thus, the first work machine can detect a monitor-target object in a region where the monitor-target object detection accuracy based on the output data of the surround view monitor sensor (the first surround view monitor sensor) of the subject machine (the first work machine) is relatively low by using the output data or the output processed data of the external surround view monitor sensor. Therefore, the surround view monitor system SYS can more appropriately detect the monitor-target object around the first work machine.

In the present embodiment, the surround view monitor system SYS may include a second work machine existing around the first work machine. Specifically, the second work machine may include a second communication device (for example, a communication device 60) and a second surround view monitor sensor that is configured to acquire data on objects around the subject machine (the second work machine), and that, as the external surround view monitor sensor, is capable of acquiring data on objects around the first work machine. The second work machine may transmit output data or output processed data of the second surround view monitor sensor to the first work machine via the second communication device.

Thus, the first work machine and the second work machine can provide data from their own surround view monitor sensors to each other. Therefore, the surround view monitor system SYS can more appropriately monitor objects around both the first work machine and the second work machine.

Further, in the present embodiment, the first work machine may acquire output data or output processed data of the external surround view monitor sensor when the positional relationship with the external surround view monitor sensor or a predetermined machine (for example, an excavator 100, a work vehicle, or a drone) including the external surround view monitor sensor satisfies a predetermined criterion. Further, the first work machine may use the acquired output data or output processed data of the external surround view monitor sensor when the positional relationship with the external surround view monitor sensor or the predetermined machine including the external surround view monitor sensor satisfies a predetermined criterion.

Thus, the first work machine can reject acquiring or using the data from the surround view monitor sensor in a situation where the monitor-target region around itself (the first work machine) may become excluded from the sensing range of the external surround view monitor sensor. Therefore, the surround view monitor system SYS can more appropriately monitor objects around the first work machine while suppressing the processing load on the first work machine.

In the present embodiment, the predetermined criterion may be the distance to the external surround view monitor sensor or the predetermined machine including the external surround view monitor sensor being relatively small compared with a predetermined threshold. Being relatively small compared with the predetermined threshold may mean being less than or equal to the predetermined threshold, or may mean being less than the predetermined threshold.

As a result, the first work machine can reject acquiring or using data from the external surround view monitor sensor in accordance with a specific situation in which the monitor-target region around itself (the first work machine) may become excluded from the sensing range of the external surround view monitor sensor.

In the present embodiment, the predetermined threshold may be defined based on the sensing range of the external surround view monitor sensor.

As a result, the first work machine can more appropriately determine a situation in which the monitor-target region around itself (the first work machine) may become excluded from the sensing range of the external surround view monitor sensor.

In the present embodiment, the predetermined threshold may be varied in accordance with the moving state of the first work machine.

As a result, in a situation in which the subject machine (the first work machine) moves and may approach the external surround view monitor sensor, the first work machine can use data from the external surround view monitor sensor including data on the object around the external surround view monitor sensor at an earlier timing. Therefore, the surround view monitor system SYS can monitor the objects around the first work machine more appropriately on the premise that the processing load on the first work machine should be suppressed as much as possible.

Although the embodiments have been described in detail above, the present disclosure is not limited to the specific embodiments, and various modifications and changes can be made within the scope of the spirit described in the claims.

What is claimed is:

1. A surround view monitor system, comprising:
    a first work machine including a first communication device; and
    an external surround view monitor sensor configured to acquire data on an object around the first work machine,
    wherein the first work machine is configured to acquire, via the first communication device, output data of the external surround view monitor sensor or processed data generated based on the output data of the external surround view monitor sensor,
    wherein the first work machine includes a first surround view monitor sensor configured to acquire data on the object around the first work machine,
    wherein the first work machine includes a hardware processor configured to detect the object around the first work machine, and
    wherein the hardware processor is configured to
        detect, based on output data of the first surround view monitor sensor, the object in a first region within a sensing range of the first surround view monitor sensor where the sensing range of the first surround view monitor sensor does not overlap with a sensing range of the external surround view monitor sensor, and
        switch between detecting the object based on the output data of the first surround view monitor sensor and detecting the object based on the output data of the external surround view monitor sensor or the processed data generated based on the output data of the external surround view monitor sensor in a case of detecting the object in a second region within the sensing range of the first surround view monitor sensor where the sensing range of the first surround view monitor sensor overlaps with the sensing range of the external surround view monitor sensor.

2. The surround view monitor system according to claim 1,
    wherein the first work machine transmits, via the first communication device, the output data of the first surround view monitor sensor or processed data generated based on the output data of the first surround view monitor sensor to a second work machine around the first work machine.

3. The surround view monitor system according to claim 1,
    wherein the first surround view monitor sensor is different in type from the external surround view monitor sensor.

4. The surround view monitor system according to claim 1,
    wherein in a top view of the first work machine, a sensing angular direction range of the first surround view monitor sensor centered about the first work machine is less than 360 degrees.

5. The surround view monitor system according to claim 1,
    wherein the hardware processor is configured to detect the object with higher accuracy in a third region than in a fourth region within the second region, and
    wherein the hardware processor is configured to detect the object in the third region based on the output data of the first surround view monitor sensor and detect the object in the fourth region based on the output data of the external surround view monitor sensor or the processed data generated based on the output data of the external surround view monitor sensor.

6. The surround view monitor system according to claim 1, further comprising:
    a second work machine around the first work machine,
    wherein the second work machine includes:
        a second communication device; and
        a second surround view monitor sensor configured to acquire data on an object around the second work machine, and
    wherein the second surround view monitor is configured to acquire the data on the object around the first work machine as the external surround view monitor, and the second work machine is configured to output data of the second surround view monitor sensor or processed data generated based on the output data of the second surround view monitor sensor to the first work machine via the second communication device.

7. The surround view monitor system according to claim 1,
    wherein the first work machine is configured to acquire the output data of the external surround view monitor sensor or the processed data generated based on the output data of the external surround view monitor sensor or to use the acquired output data of the external surround view monitor sensor or processed data generated based on the output data of the external surround view monitor sensor, when a positional relationship with the external surround view monitor sensor or a predetermined machine including the external surround view monitor sensor satisfies a predetermined criterion.

8. The surround view monitor system according to claim 7,
    wherein the predetermined criterion is that a distance between the first work machine and the external surround view monitor sensor or the predetermined machine is smaller than a predetermined threshold.

9. The surround view monitor system according to claim 8,
    wherein the predetermined threshold is varied in accordance with a moving state of the first work machine.

10. The surround view monitor system according to claim 8, wherein the predetermined threshold is defined based on the sensing range of the first surround view monitor sensor and the sensing range of the external surround view monitor sensor.

11. The surround view monitor system according to claim 10, wherein
    the first surround view monitor sensor includes a plurality of types of surround view monitor sensors, and
    the predetermined threshold is defined based a sensing range of one of the plurality of types of surround view monitor sensors, the one having a smaller sensing range than another one of the plurality of types of surround view monitor sensors.

12. The surround view monitor system according to claim 8, wherein
    the external surround view monitor sensor is included in the predetermined machine, and
    the predetermined threshold is a sum of a shortest distance between the first work machine and a border of the sensing range of the first surround view monitor sensor as seen in a top view and a shortest distance between the predetermined machine and a border of the sensing range of the external surround view monitor sensor as seen in a top view.

13. The surround view monitor system according to claim 8, wherein the external surround view monitor sensor is included in the predetermined machine, and the predetermined threshold is obtained by subtracting a predetermined allowance from a sum of a shortest distance between the first work machine and a border of the sensing range of the first surround view monitor sensor as seen in a top view and a shortest distance between the predetermined machine and a border of the sensing range of the external surround view monitor sensor as seen in a top view.

14. A surround view monitor system comprising:

a first work machine including a first communication device; and an external surround view monitor sensor configured to acquire data on an object around the first work machine, wherein the first work machine is configured to acquire, via the first communication device, output data of the external surround view monitor sensor or processed data generated based on the output data of the external surround view monitor sensor, wherein the first work machine is configured to acquire the output data of the external surround view monitor sensor or the processed data generated based on the output data of the external surround view monitor sensor or to use the acquired output data of the external surround view monitor sensor or processed data generated based on the output data of the external surround view monitor sensor, when a positional relationship with the external surround view monitor sensor or a predetermined machine including the external surround view monitor sensor satisfies a predetermined criterion, wherein the predetermined criterion is that a distance between the first work machine and the external surround view monitor sensor or the predetermined machine is smaller than a predetermined threshold, and wherein the predetermined threshold is defined based on the sensing range of the external surround view monitor sensor.

15. A work machine, comprising:

a surround view monitor sensor configured to acquire data on an object around the work machine;

a hardware processor configured to detect the object around the first work machine; and a communication device, wherein the work machine acquires, via the communication device, output data of an external surround view monitor sensor configured to acquire data on an object around the work machine, or processed data generated based on the output data of the external surround view monitor sensor, wherein the hardware processor is configured to detect, based on output data of the surround view monitor sensor, the object in a first region within a sensing range of the surround view monitor sensor where the sensing range of the surround view monitor sensor does not overlap with a sensing range of the external surround view monitor sensor, and switch between detecting the object based on the output data of the surround view monitor sensor and detecting the object based on the output data of the external surround view monitor sensor or the processed data generated based on the output data of the external surround view monitor sensor in a case of detecting the object in a second region within the sensing range of the surround view monitor sensor where the sensing range of the surround view monitor sensor overlaps with the sensing range of the external surround view monitor sensor.

16. The work machine, comprising according to claim 15, wherein the work machine is configured to transmit, via the communication device, output data of the surround view monitor sensor or processed data generated based on the output data of the surround view monitor sensor to another work machine around the work machine.

* * * * *